United States Patent
Takahashi et al.

(10) Patent No.: US 11,456,633 B2
(45) Date of Patent: Sep. 27, 2022

(54) PERMANENT MAGNET ROTATING ELECTRIC MACHINE

(71) Applicant: MITSUBISHI ELECTRIC CORPORATION, Tokyo (JP)

(72) Inventors: Tomohira Takahashi, Tokyo (JP); Junji Kitao, Tokyo (JP); Yoshihiro Miyama, Tokyo (JP); Masatsugu Nakano, Tokyo (JP); Kosho Yamane, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 201 days.

(21) Appl. No.: 16/637,578

(22) PCT Filed: Jul. 6, 2018

(86) PCT No.: PCT/JP2018/025712
§ 371 (c)(1),
(2) Date: Feb. 7, 2020

(87) PCT Pub. No.: WO2019/064801
PCT Pub. Date: Apr. 4, 2019

(65) Prior Publication Data
US 2020/0220398 A1    Jul. 9, 2020

(30) Foreign Application Priority Data

Sep. 28, 2017  (JP) .............................. JP2017-187507

(51) Int. Cl.
*H02K 1/27* (2022.01)
*H02K 1/276* (2022.01)
(Continued)

(52) U.S. Cl.
CPC ............. *H02K 1/276* (2013.01); *H02K 21/16* (2013.01); *H02K 29/03* (2013.01)

(58) Field of Classification Search
None
See application file for complete search history.

(56) References Cited

U.S. PATENT DOCUMENTS

| 2014/0191628 A1* | 7/2014 | Nakano ................ H02K 11/225 |
| | | 310/68 B |
| 2017/0117762 A1* | 4/2017 | Takahata ............. F04C 18/0215 |

FOREIGN PATENT DOCUMENTS

| DE | 102012205191 A1 * | 10/2013 | ............. H02K 1/276 |
| JP | 11-178255 A | 7/1999 | |

(Continued)

OTHER PUBLICATIONS

Machine Translation of JP 11206046 A (Year: 1999).*
(Continued)

*Primary Examiner* — Thomas Truong
(74) *Attorney, Agent, or Firm* — Xsensus LLP

(57) ABSTRACT

A rotor of the permanent magnet rotating electric machine includes a rotor core, a plurality of magnets, and magnetic slits. Each of the magnetic slits is formed in a core region being a region between magnets of the plurality of magnets, and a gap. The magnetic slits are regions having a lower magnetic permeability than a magnetic permeability of the core region. One end of each of the magnetic slits, which is closer to an outer periphery of the rotor, is positioned in a portion of the core region on the same direction side as a direction of a force in a circumferential direction of the rotor, and another end closer to the rotation axis center of the rotor is positioned on the magnetic pole center or in a portion of the core region on a side opposite to the direction of the force.

13 Claims, 21 Drawing Sheets

(51) Int. Cl.
*H02K 21/16* (2006.01)
*H02K 29/03* (2006.01)

(56) References Cited

FOREIGN PATENT DOCUMENTS

| JP | 11-206046 A | | 7/1999 | |
| --- | --- | --- | --- | --- |
| JP | 11206046 A | * | 7/1999 | |
| JP | 2004-104962 A | | 4/2004 | |
| JP | 2004104962 A | * | 4/2004 | ........... H02K 1/2766 |
| JP | 3630332 B2 | * | 3/2005 | |
| JP | 3739890 B2 | * | 1/2006 | |
| JP | 3739890 B2 | | 1/2006 | |
| JP | 2010-183648 A | | 8/2010 | |
| JP | 2012-23904 A | | 2/2012 | |
| JP | 2013-255321 A | | 12/2013 | |
| JP | 2015-53757 A | | 3/2015 | |
| JP | 2015-053801 A | | 3/2015 | |
| JP | 2015053801 A | * | 3/2015 | |

OTHER PUBLICATIONS

Machine Translation of JP 2004104962 A (Year: 2004).*
Machine Translation of JP 3630332 B2 (Year: 2006).*
Machine Translation of JP 3739890 B2 (Year: 2006).*
Machine Translation of JP 2015053801 A (Year: 2015).*
Machine Translation of DE 102012205191 A1 (Year: 2013).*
Chinese Office Action dated Sep. 8, 2021, in Chinese patent Application No. 201880061795.3.
Office Action dated Mar. 16, 2021, in corresponding Japanese patent Application No. 2019-544301, 12 pages.
Japanese Office Action dated Dec. 22, 2020, in corresponding Japanese Patent Application No. 2019-544301.
International Search Report dated Oct. 2, 2018 in PCT/JP2018/025712 filed on Jul. 6, 2018, 1 page.

* cited by examiner

PERMANENT MAGNET ROTATING ELECTRIC MACHINE

TECHNICAL FIELD

The present invention relates to a rotating electric machine using permanent magnets.

BACKGROUND ART

A permanent magnet rotating electric machine, which is advantageous in downsizing and increase in output, is adopted in many cases as a rotating electric machine for industrial use and rotating electric machines for an electric vehicle and for a hybrid vehicle. Among the permanent magnet rotating electric machines described above, when the permanent magnet rotating electric machine has such a structure that permanent magnets are embedded in a rotor core, two kinds of torque can be obtained. Specifically, a magnet torque is generated by a magnet magnetic flux from the permanent magnets, and a reluctance torque is generated by a reluctance magnetic flux from a stator. A final torque of a motor is determined by a sum of the two kinds of torque.

However, the above-mentioned rotating electric machine having a general structure is characterized in that current phase angles β at which the above-mentioned two kinds of torque have peak values are different from each other. Specifically, the magnet torque has a positive peak value when β=0° is given, and the reluctance torque has a positive peak value when β=45° is given. Thus, a peak value of a total torque appears when β is larger than 0 degrees or when β is smaller than 45 degrees. Specifically, for current control of the motor, when a maximum torque is to be generated, the current phase angle is required to be set to a current phase angle β at which neither of the two kinds of torque has the peak value. Thus, a value of the maximum torque sometimes becomes smaller than a sum of the peak values of the two kinds of torque.

Meanwhile, there has been proposed a structure in which a rotor has through holes, each having a slit shape, for deviating a magnetic flux from permanent magnets toward a stator in a rotating direction of the rotor (for example, Patent Literature 1).

Further, there has been proposed a structure having slits in a core portion of a rotor, which is located on an outer periphery side of magnet insertion holes. The slits are drilled in a rotor magnetic pole center line direction only on a rotor reversing direction side of the rotor magnetic pole center line (for example, Patent Literature 2).

Further, there has been proposed a structure in which an air gap having a predetermined sectional shape is formed in a rotor at such a position as to have a delay phase with respect to a d axis, which corresponds to a magnetic flux direction of permanent magnets (for example, Patent Literature 3).

CITATION LIST

Patent Literature

Patent Literature 1 Japanese Unexamined Patent Application Publication No. H11-206046 A (Page 2 to 5, FIG. 2)
Patent Literature 2 Japanese Unexamined Patent Application Publication No. H11-178255 A (Page 2 to 4, FIG. 2)
Patent Literature 3 J Japanese Unexamined Patent Application Publication No. 2012-023904 A (Page 4 to 10, FIG. 2)

SUMMARY OF INVENTION

Technical Problem

In the structures disclosed in Patent Literatures 1 to 3, a positional relationship between a path of the magnet magnetic flux and a path of the reluctance magnetic flux is changed so that the current phase angle β at which the magnet torque has the peak value and the current phase angle β at which the reluctance torque has the peak value can be relatively set closer to each other. However, the air gap for localizing the magnet magnetic flux is present at a position of blocking the path of the reluctance magnetic flux, which leads to reduction of the reluctance torque itself. Thus, a final torque is sometimes reduced.

The present invention has an object to obtain a permanent magnet rotating electric machine capable of improving a total torque of a magnet torque and a reluctance torque.

Solution to Problem

According to the present invention, there is provided a permanent magnet rotating electric machine, including:
a stator including a stator core and coils; and
a rotor, which is arranged on an inner side of the stator with a gap being a micro-gap, and is rotatable,
wherein the rotor includes:
a rotor core;
a plurality of magnets embedded in the rotor core; and
magnetic slits, each being formed in a core region of the rotor core, which is a region located between the magnets for forming one magnetic pole of the plurality of magnets and the gap, the magnetic slits being regions having a lower magnetic permeability than a magnetic permeability of the core region,
wherein one of ends of each of the magnetic slits in a longitudinal direction of the magnetic slit, which is closer to an outer periphery of the rotor than another end, is positioned in a portion of the core region, which is located on the same direction side as a direction of a force in a circumferential direction of the rotor, the force being applied to the rotor by torque, with respect to a magnetic pole center of the one magnetic pole,
wherein the another one of the ends of each of the magnetic slits, which is closer to a rotation axis center of the rotor, is positioned on the magnetic pole center or in a portion of the core region, which is located on a side opposite to the direction of the force in the circumferential direction, the force being applied by the torque, with respect to the magnetic pole center, and
wherein an area of the portion of the core region, which is located on the same direction side as the direction of the force with respect to the magnetic slit, is smaller than an area of the portion of the core region, which is located on the side opposite to the direction of the force with respect to the magnetic slit.

Advantageous Effects of Invention

The permanent magnet rotating electric machine of the present invention is capable of improving a total torque of a magnet torque and a reluctance torque.

DESCRIPTION OF EMBODIMENTS

First Embodiment

Figure 1:
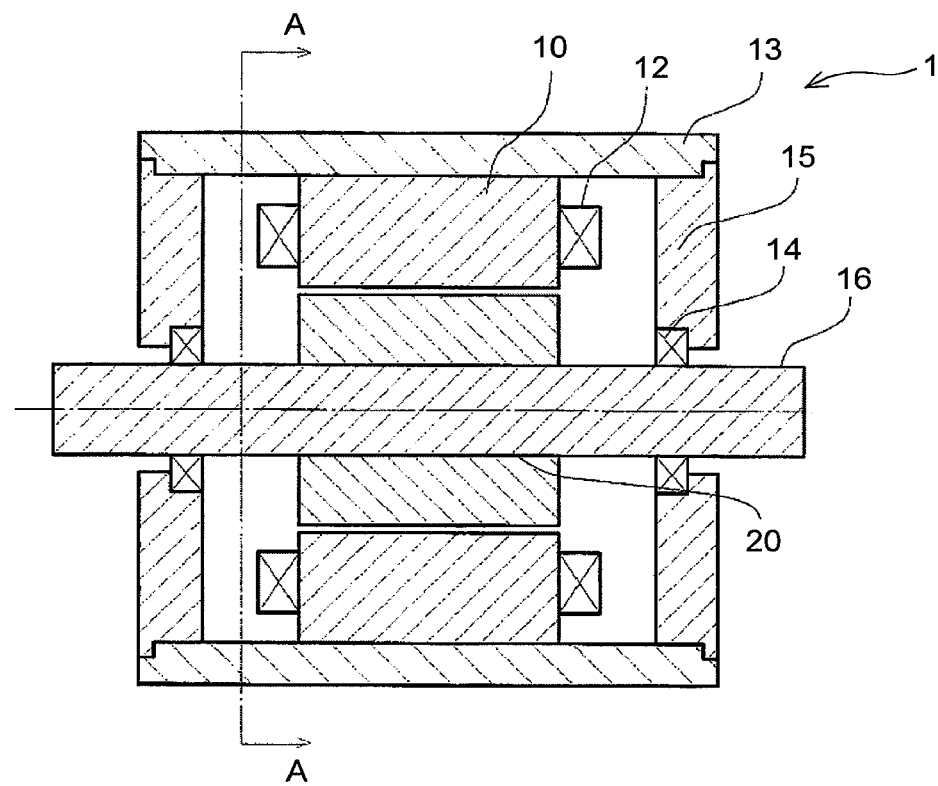
FIG. 1 is a longitudinal sectional view of a permanent magnet rotating electric machine according to a first embodiment of the present invention, which includes a rotation axis direction.

FIG. 1 is a longitudinal sectional view of a rotating electric machine according to a first embodiment for carrying out the present invention, which includes a rotation axis direction.

In FIG. 1, a permanent magnet rotating electric machine 1 includes a frame 13, brackets 15, and a rotary shaft 16. The brackets 15 are arranged on both end surfaces of the frame 13 in a rotation axis direction, and are configured to retain bearings 14 on a radially inner side. Further, the permanent magnet rotating electric machine 1 includes a rotor 20 and a stator 10. The rotor 20 is supported so as to be rotatable around a rotation axis of the rotary shaft 16 as its center through intermediation of the bearings 14. The stator 10 is firmly fixed to an inner periphery of the frame 13, and is arranged on a radially outer side of the rotor 20 through an air gap therebetween.

Figure 2:
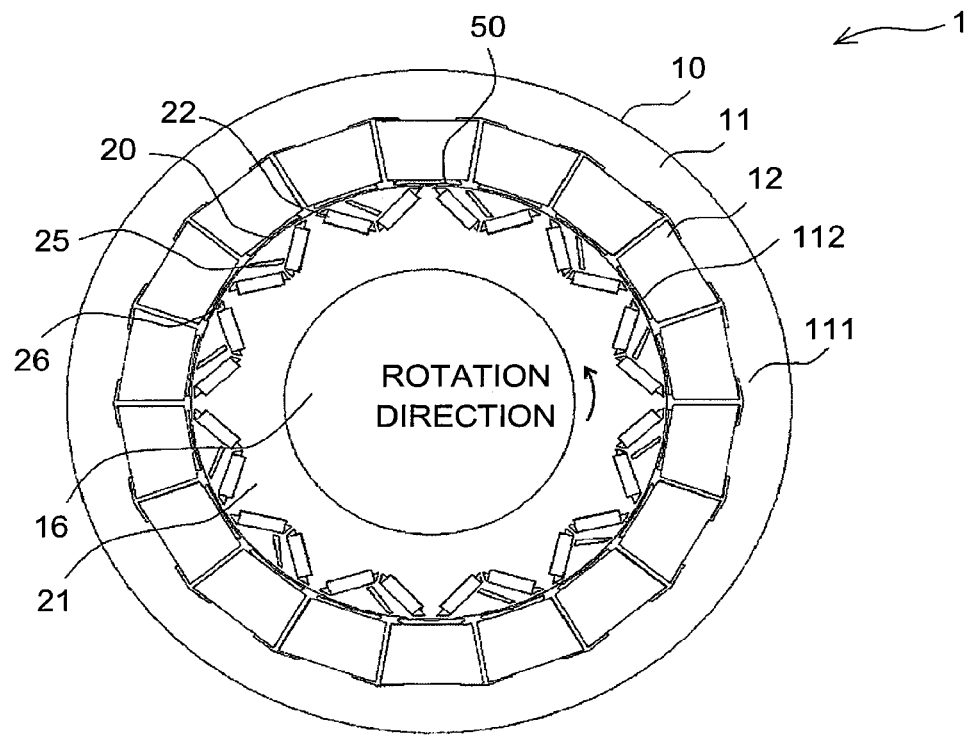
FIG. 2 is a sectional view of the permanent magnet rotating electric machine taken along the line A-A perpendicular to the rotation axis direction, which is an illustration of a basic structure according to the first embodiment of the present invention.

FIG. 2 is a sectional view taken along the line A-A perpendicular to the rotation axis direction, which is an illustration of a basic structure of the permanent magnet rotating electric machine according to the first embodiment of the present invention.

The permanent magnet rotating electric machine 1 illustrated in FIG. 2 includes the stator 10 and the rotor 20 having a columnar shape, which is arranged on an inner side of the stator 10. The rotor 20 is arranged so as to be spaced apart from the stator 10 with a gap 50 being a micro-gap therebetween, and hence the rotor 20 is configured so as to be rotatable.

The stator 10 includes a stator core 11 and coils 12. The stator core 11 has, for example, a cylindrical shape, and is formed in a cylindrical shape by, for example, laminating a plurality of thin electromagnetic steel plates, each having an annular shape, in an axial direction of the rotary shaft 16 of the rotor 20.

Further, the stator core 11 has a core back 111 and eighteen tooth portions 112. The core back 111 has an annular shape, and is located on an outer periphery side of the stator core 11. The tooth portions 112 project from the core back 111 toward an inner periphery side, and are formed so as to be spaced apart from each other in a circumferential direction of the stator core 11.

The coils 12 are wound around the tooth portions 112 of the stator core 11 through insulators therebetween, and are mounted in slots between the tooth portions 112. For the permanent magnet rotating electric machine 1 according to this embodiment, a concentrated winding structure is described as an example. The concentrated winding structure is a structure in which one coil is wound around one tooth portion 112. Thus, two coils are accommodated in each slot between the tooth portions 112.

The rotor 20 includes a rotor core 21, twenty-four permanent magnets 22, and the rotary shaft 16. The rotary shaft 16 is fixed to a center of the rotor core 21, and has both ends supported by the bearings 14 provided to the brackets 15 of the frame 13 so as to be rotatable. The rotor 20 has a hollow in a center. In FIG. 2, for convenience of description, the frame 13, the brackets 15, and the bearings 14 are omitted.

The twenty-four permanent magnets 22 are embedded in holes formed in the rotor core 21. The rotor core 21 has twelve magnetic poles. One magnetic pole is formed by two permanent magnets 22 embedded in the rotor core 21. Each of the two permanent magnets 22 for forming one magnetic pole has a rectangular shape, and the two permanent magnets are arranged in a V-shaped pattern so as to be open from a rotation axis center side of the rotor 20 toward an outer periphery side.

The permanent magnets 22 are arranged so that twelve sets, each being formed of two permanent magnets 22 arranged in the V-shaped pattern, are arranged in the rotor core 21 evenly in the circumferential direction. In this embodiment, each of the permanent magnets 22 is magnetized at a right angle with respect to sides in a longitudinal direction of a corresponding one of the permanent magnets 22. The permanent magnets 22 are arranged in the rotor core 21 so that the permanent magnet 22 magnetized with a magnetic flux from a radially inner side of the rotor core 21 toward a radially outer side of the rotor core 21 and the permanent magnet 22 magnetized with a magnetic flux from the radially outer side of the rotor core 21 toward the radially inner side of the rotor core 21 are alternately arranged for each set.

With the V-shaped magnet structure using two permanent magnets 22, it is easy to utilize a magnet torque and a reluctance torque at the same time. Further, inmost cases, a rotor core region formed between each of the permanent magnets 22 and the gap 50 is present. Thus, a high effect is attained when magnetic slits 25 are formed. Further, a design is easy. When there is a restriction in manufacture, however, for example, the number of permanent magnets 22 for forming one magnetic pole, and a shape and a position of each of the permanent magnets 22 may be changed.

The rotor 20 is rotated around the above-mentioned rotation axis as its center by energization of the coils 12 to form a rotating electric field. A rotating direction in this embodiment is described as a counterclockwise direction.

Further, the permanent magnet rotating electric machine 1 according to this embodiment is to be used for a power running operation. The power running operation is an operation for converting electric energy for energizing the coils 12 into kinetic energy for rotation of the rotor 20. Detailed description thereof is herein omitted because the power running operation is not a main idea of the present invention. Further, in this embodiment, a direction of a force in the circumferential direction, which is applied to the rotor 20 by the energization of the coils 12, is the same as the rotating direction of the rotor 20.

Further, in this embodiment, description is made of, as an example, the permanent magnet rotating electric machine in which the stator 10 has the eighteen tooth portions 112 and the rotor 20 has the twelve magnetic poles, specifically, the permanent magnet rotating electric machine having a 2:3 ratio as a ratio of the number of magnetic poles to the number of slots.

Flux barriers 26 are formed in the rotor core 21 so that a magnet magnetic flux 31 from the permanent magnets 22 is likely to be interlinked with the stator 10 side via the gap 50. In this embodiment, the flux barriers 26 are formed so as to be positioned on both end sides of each of the permanent magnets 22 in the longitudinal direction. As a result, generation of such a path of the magnet magnetic flux 31 as to be closed in the rotor core 21 can be suppressed.

Further, in the rotor core 21, the magnetic slits 25 made of a material having a lower magnetic permeability than a magnetic permeability of a raw material itself for forming the rotor core 21 are formed. Specifically, a region of each of the magnetic slits 25 is a low magnetic permeability region having a lower magnetic permeability than that of a region of the rotor core 21. The region of each of the magnetic slits 25 is only required to be the low magnetic permeability region having a lower magnetic permeability than that of the region of the rotor core 21, and thus may be an air gap. Further, the magnetic slits 25 may be filled with, for example, a resin or a heat dissipating material, which has a lower magnetic permeability than that of the region of the rotor core 21, to increase strength of the rotor core 21 or enhance a cooling effect for the rotor core 21 and the permanent magnets 22. In general, a material used to form the rotor core 21 has a higher magnetic permeability than that of air. Thus, even when the air gap is formed without using another material, the low magnetic permeability region having a lower magnetic permeability than that of the rotor core 21 can be formed as the region of each of the magnetic slits 25.

Figure 3:
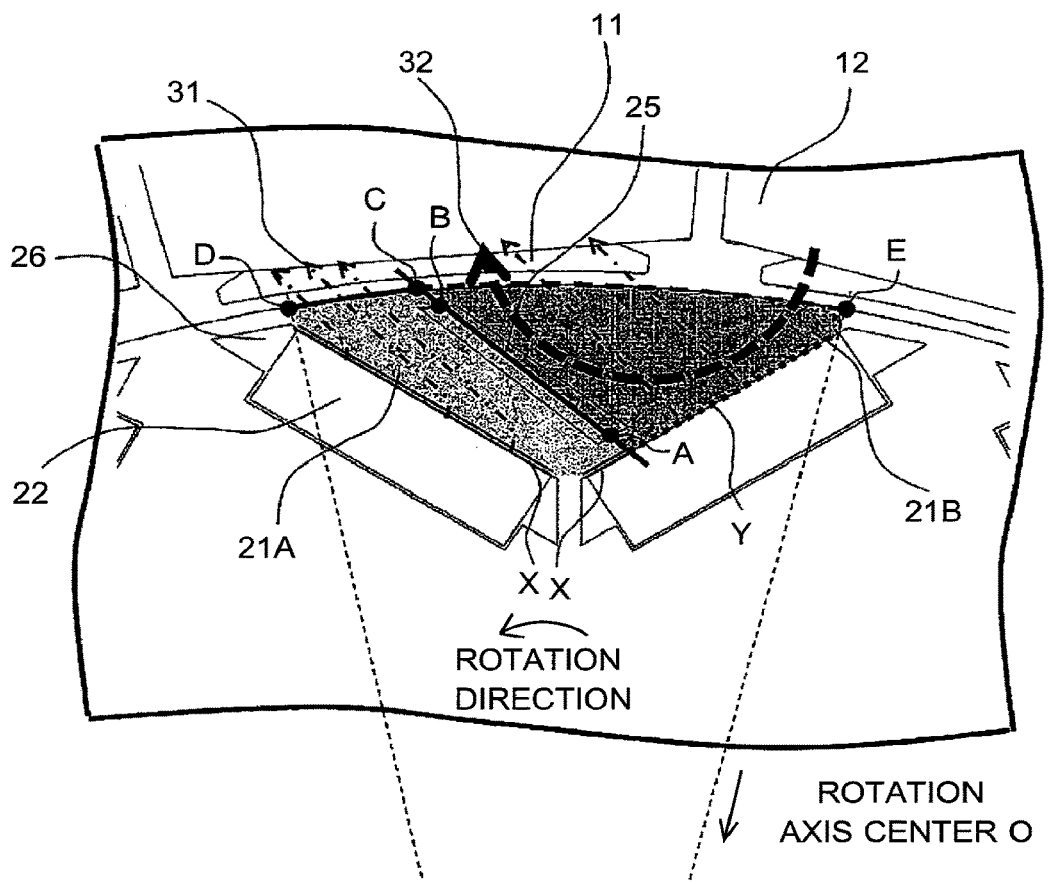
FIG. 3 is a view for illustrating a main part of the permanent magnet rotating electric machine, which is an illustration of the basic structure according to the first embodiment of the present invention.

The rotor core 21 including the magnetic slits 25 is described in further detail with reference to FIG. 3. FIG. 3 is an enlarged view of FIG. 2 mainly for a part of the rotor 20, which forms one magnetic pole, in the permanent magnet rotating electric machine 1 according to this embodiment.

The magnetic slit 25 is formed of a material having a lower magnetic permeability than that of the rotor core 21 as described above. The magnetic slit 25 has an elongated shape extending from a vicinity of the permanent magnets 22 to a vicinity of the gap 50.

The magnetic slit 25 is formed with an inclination in a region of the rotor core 21, which is located between the permanent magnets 22 for forming one magnetic pole and the gap 50. The magnetic slit 25 is formed so that one of ends of the magnetic slit 25 in the longitudinal direction, which is closer to the outer periphery of the rotor 20 than another end, is formed in a portion of the region of the rotor core 21, which is located on the same direction side as a direction of a force in a circumferential direction, the force being applied to the rotor 20 by torque, with respect to a magnetic pole center being a center of the magnetic pole for forming one magnetic pole. Further, the magnetic slit 25 is formed so that the another end in the longitudinal direction, which is located at a position closer to the rotation axis center of the rotor 20 than the one end, is positioned on the magnetic pole center or in a portion of the region of the rotor core 21, which is located on a side opposite to the direction of the force in the circumferential direction, the force being applied to the rotor 20 by energization of the coils 12, with respect to the magnetic pole center. The ends herein correspond to both ends of the magnetic slit 25 in the longitudinal direction, and more specifically, correspond to sides at both ends.

The rotor core region located between the permanent magnets 22 for forming one magnetic pole and the gap 50 is separately described as a region located on the same direction side as the direction of the force described above and a region located on the side opposite to the direction of the force described above with respect to the magnetic slit 25. In this case, an area of the region on the same direction side as the direction of the force described above with respect to the magnetic slit 25 is smaller than an area of the region on the side opposite to the direction of the force described above with respect to the magnetic slit 25. Each of the regions is formed by, for example, an outer peripheral side of the rotor, magnetic flux generation sides of the magnet, and the magnetic slit.

When an end point on the end of the magnetic slit 25, which is closer to the rotation axis center of the rotor 20, is represented as an end point A and an end point on the end closer to the outer periphery of the rotor 20 is represented as an end point B, a straight line for imaginarily connecting the end point A and the end point B is represented as a straight line AB. An intersection point between the straight line AB and a surface of the rotor 20 is represented as an intersection point C. The end point A in this case is represented as a point on the end, which is closest to a magnet side or an extension line of the magnet side. When there are a plurality of points which may be the end point A, a point located in the center or a point closest to the center in arrangement of the points is set as the end point A. Further, the end point B is represented as a point closest to the surface of the rotor 20 on the end. When there are a plurality of points which may be the end point B, a point located in the center or a point closest to the center in arrangement of the points is set as the end point B.

When the rotation axis center of the rotor 20 is represented by O, a line for imaginarily connecting the intersection point C and the rotation axis center O is represented as a straight line OC. An intersection point between an extension line of a straight line for imaginarily connecting an end point on an end side of the permanent magnet 22 located on a forward side of the straight line OC in the rotating direction, which is located on a radially outermost side, and the rotation axis center O, and the surface of the rotor 20 on the extension line, is represented as an intersection point D.

An intersection point between an extension line of a straight line for imaginarily connecting an end point on an end side of the permanent magnet 22 located on a backward side of the straight line OC in the rotating direction at the time of a power running operation, which is located on a radially outermost side, and the rotation axis center O, and the surface of the rotor 20 on the extension line is represented as an intersection point E. In the permanent magnets 22 for forming one magnetic pole, a total length of all portions of the magnetic flux generation sides of the permanent magnets 22, which are located on the forward side of the straight line AB in the rotating direction, is represented by X. Further, a total length of a portion of the magnetic flux generation side of the permanent magnet 22, which is located on the backward side of the straight line AB in the rotating direction at the time of the power running operation, is represented by Y. In this case, a shape of the magnetic slit 25 satisfies Expression (1) using an arc CD for connecting the intersection point C and the intersection point D, the total length X, an arc CE for connecting the intersection point C and the intersection point E, and the total length Y.

[Math. 1]

$$\frac{X}{\text{arc } CD} > \frac{Y}{\text{arc } CE} \quad (1)$$

Further, the rotor core 21, which is located between the permanent magnets 22 for forming one magnetic pole and the gap 50, can be divided by the straight line AB into a rotating-direction forward side core region 21A at the time of the power running operation and a rotating-direction backward side core region 21B at the time of the power running operation. In this case, an area of the rotating-direction forward side core region 21A is smaller than an area of the rotating-direction backward side core region 21B.

Now, a state of the magnetic fluxes being sources of generation of the torque is described. The magnet magnetic flux 31 generated from portions of the magnetic flux generation sides of the permanent magnets 22, which are located on the forward side of the straight line AB in the rotating direction, is likely to flow from the rotor core 21 to the gap 50. However, a direction thereof is restricted by the magnetic slit 25 having a lower magnetic permeability than that of the rotor core 21. With the shape of the magnetic slit 25, which satisfies the condition described above, the magnet magnetic flux 31 is localized on the forward side in the rotating direction in the rotating-direction forward side core region 21A. As a result, a current phase angle at which the magnet torque has a positive peak value can be set larger than a related-art current phase angle.

Further, a path of a reluctance magnetic flux 32 which is likely to flow through the rotor core 21 from the stator core 11 via the gap 50 is restricted by the magnetic slit 25 having a lower magnetic permeability than that of the rotor core 21. Then, the reluctance magnetic flux 32 passes through the rotating-direction backward side core region 21B without reaching the rotating-direction forward side core region 21A. As a result, a current phase angle at which the reluctance torque has a positive peak value can be set smaller than a related-art current phase angle. In addition, the area of the rotating-direction backward side core region 21B is larger than the area of the rotating-direction forward side core region 21A. Thus, even when the magnetic slit 25 is formed, the reluctance magnetic flux 32 is not reduced. Thus, the reluctance torque equal to that in a case without the magnetic slit 25 can be generated.

Thus, a differential between the current phase angle at which the magnet torque has the positive peak value and the current phase angle at which the reluctance torque has the positive peak value is ultimately reduced. Hence, a total torque at the time of the power running operation can be improved.

Figure 4:
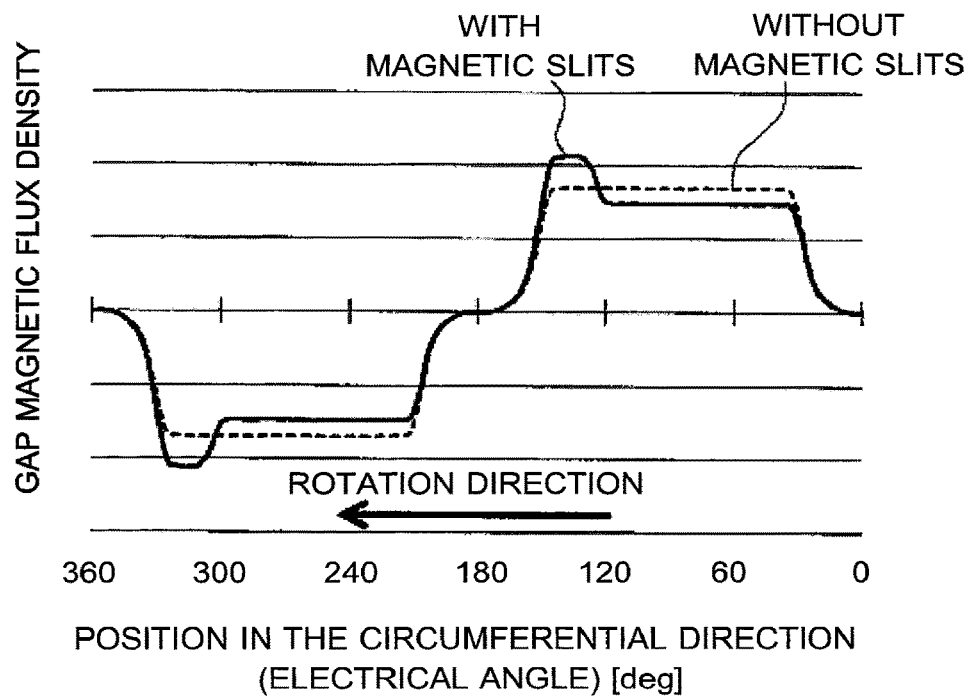
FIG. 4 is a graph for showing a relationship between a position of a magnetic flux in a circumferential direction and a gap magnetic flux density according to the first embodiment of the present invention.

FIG. 4 shows a gap magnetic flux density distribution with the magnet magnetic flux 31 for one period of an electrical angle (for two magnetic poles) under a non-energized state, which is analyzed with use of a finite element method. A horizontal axis represents a position in the circumferential direction, and a vertical axis represents a magnetic flux density of the gap 50. A dotted line in the graph of FIG. 4 indicates a relationship between the position in the circumferential direction and the gap magnetic flux density without the magnetic slits 25. Further, a solid line indicates a relationship between the position in the circumferential direction and the gap magnetic flux density with the magnetic slits 25. In a case in which the magnetic slits 25 are formed, the gap magnetic flux density in one magnetic pole deviates in the rotating direction of the rotor 20 at the time of the power running operation in comparison to that in a case without the magnetic slits 25.

Figure 5:
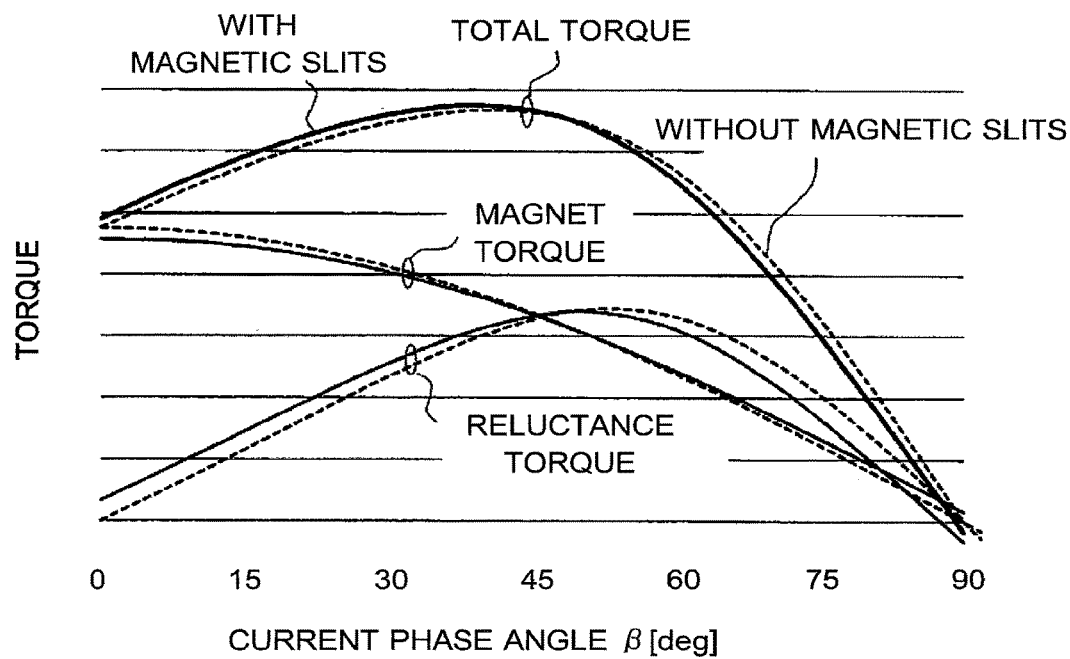
FIG. 5 is a graph for showing a relationship between a phase and torque according to the first embodiment of the present invention.

FIG. 5 is a graph for showing a change in torque with respect to the current phase angle β under a condition that a current value is constant, which is analyzed with use of a finite element method. A horizontal axis represents the current phase angle β, and a vertical axis represents the torque. In the graph, the magnet torque, the reluctance torque, and a total torque thereof are shown. Each of the dotted lines in FIG. 5 indicates results obtained in the case without the magnetic slits 25. Further, each of the solid lines in FIG. 5 indicates results obtained in the case with the magnetic slits 25.

In the total torque corresponding to the sum of the magnet torque and the reluctance torque, the current phase angle β at which the peak value appears in the case with the magnetic slits 25 is smaller than that in the case without the magnetic slits 25. Further, the peak value itself of the total torque increases. The following can be presumed. Hitherto, the magnet torque has the positive peak value when the current phase angle β=0 is given, and the reluctance torque has the positive peak value when the current phase angle β=45 is given. With the magnetic slits 25, the differential between the current phase angle β at which the magnet torque has the positive peak value and the current phase angle β at which the reluctance torque has the positive peak value is reduced, and hence the total torque is improved.

Thus, even when a structure is changed by forming the magnetic slit 25 in a range which meets a relation condition between the area of the rotating-direction forward side core region 21A and the area of the rotating-direction backward side core region 21B described above or satisfies Expression (1), the differential between the current phase angle for the magnet torque and the current phase angle for the reluctance torque can be reduced. Thus, the total torque of the magnet torque and the reluctance torque of the permanent magnet rotating electric machine while performing the power running operation can be improved.

Second Embodiment

Figure 6:
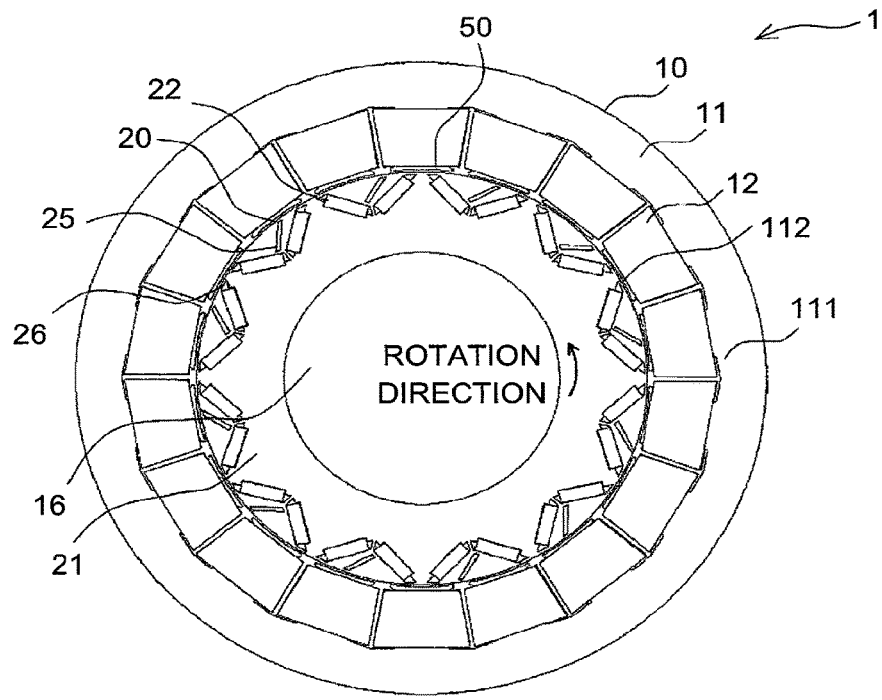
FIG. 6 is a sectional view of a permanent magnet rotating electric machine taken along the line A-A perpendicular to a rotation axis direction, which is an illustration of a basic structure according to a second embodiment of the present invention.

FIG. 6 is a sectional view taken along the line A-A perpendicular to a rotation axis direction, which is an illustration of a basic structure of a permanent magnet rotating electric machine according to a second embodiment of the present invention. In FIG. 6, the configurations denoted by the same reference symbols as those of FIG. 2 are the same or corresponding configurations, and description thereof is herein omitted. The second embodiment is different from the first embodiment of the present invention in the configuration of each of the magnetic slits 25 and an operating environment of the permanent magnet rotating electric machine 1.

In the first embodiment, the structure of the permanent magnet rotating electric machine to be used for the power running operation has been described. The permanent magnet rotating electric machine 1 according to this embodiment is supposed to be used for a regeneration operation. The regeneration operation is an operation for converting kinetic energy given to the rotor 20 into electrical energy to extract the electrical energy from terminals of the coils 12. In this case, the permanent magnet rotating electric machine 1 acts as a power generator. The action of the permanent magnet rotating electric machine as the power generator is not a main idea of the present invention, and thus detailed description thereof is herein omitted.

The structure of the permanent magnet rotating electric machine 1 according to this embodiment is described below. As illustrated in FIG. 6, similarly to the first embodiment, the permanent magnet rotating electric machine according to this embodiment includes the stator 10 and the rotor 20 having a columnar shape, which is arranged on an inner side of the stator 10. The rotor 20 is arranged so as to be spaced apart from the stator 10 with the gap 50 being a micro-gap therebetween, and hence the rotor 20 is configured so as to be rotatable.

The stator 10 includes the stator core 11 and the coils 12. The stator core 11 has, for example, a cylindrical shape, and is formed in a cylindrical shape by, for example, laminating a plurality of thin electromagnetic steel plates, each having an annular shape, in an axial direction of the rotary shaft of the rotor 20.

The coils 12 are wound around the tooth portions 112 of the stator core 11 through insulators therebetween, and are mounted in slots between the tooth portions 112. For the permanent magnet rotating electric machine 1 according to this embodiment, a concentrated winding structure is described as an example.

The rotor 20 includes the rotor core 21, the twenty-four permanent magnets 22, and the rotary shaft 16. The rotary shaft 16 is fixed to the center of the rotor core 21, and has both ends supported by the bearings 14 (not shown) provided to the brackets 15 (not shown) of the frame 13 (not shown) so as to be rotatable. Further, the flux barriers 26 are formed in the rotor core 21 to suppress such a magnetic flux path of the magnet magnetic flux 31 as to close the magnetic flux in the rotor core so that the magnet magnetic flux 31 is likely to be interlinked with the stator 10 side via the gap 50. Even in this embodiment, in FIG. 6, there is illustrated an example in which the flux barriers 26 are formed on both end sides of each of the permanent magnets 22 in the longitudinal direction.

The rotor 20 receives the kinetic energy from an outside to be rotated. A rotating direction in this embodiment is described as a counterclockwise direction. A direction of a force in the circumferential direction, which is applied to the rotor 20 by energization of the coils 12 at the time of the regeneration operation, is opposite to the rotating direction of the rotor 20. Specifically, torque exerted by the permanent magnet rotating electric machine 1 itself at the time of the regeneration operation acts so as to cancel out torque from the outside.

Further, in this embodiment, with reference to FIG. 6, description is made with an example in which the stator 10 has eighteen tooth portions 112 and the rotor 20 has twelve magnetic poles, specifically, a ratio of the number of magnetic poles to the number of slots is 2:3.

Figure 7:
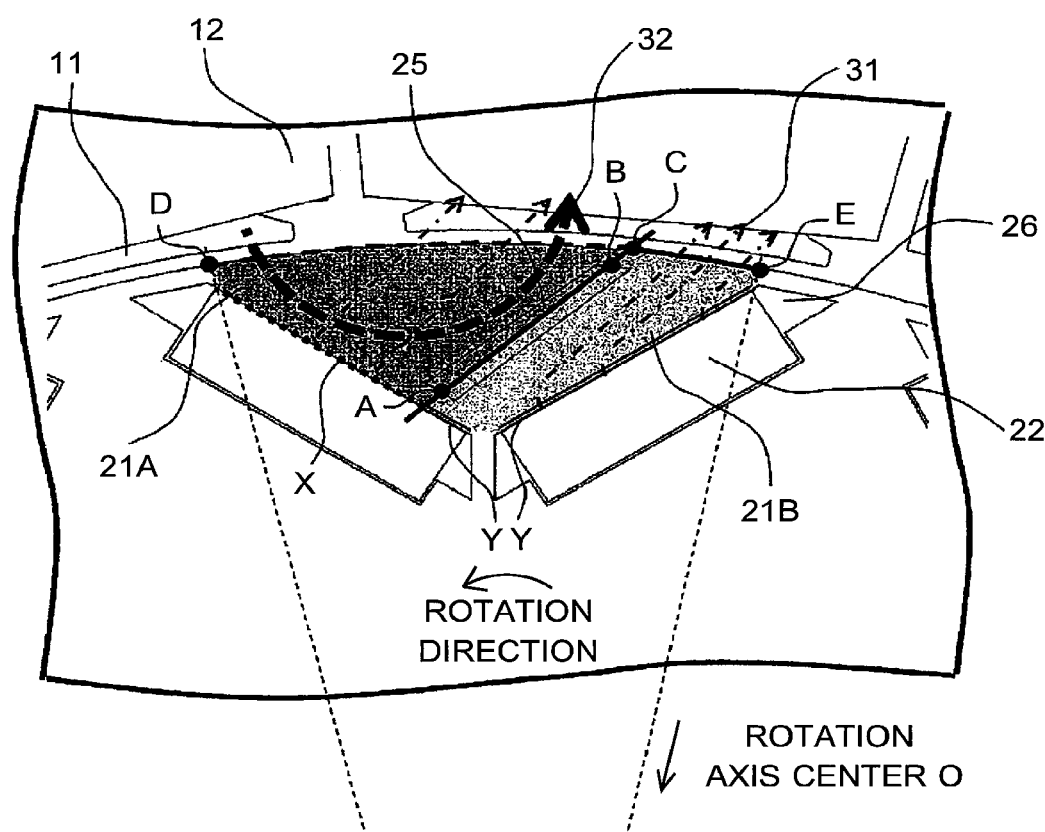
FIG. 7 is a view for illustrating a main part of the permanent magnet rotating electric machine, which is an illustration of the basic structure according to the second embodiment of the present invention.

A configuration of the magnetic slit 25 in this embodiment is described in detail with reference to FIG. 7. FIG. 7 is an enlarged view of FIG. 6 mainly for a part of the rotor 20, which forms one magnetic pole, in the permanent magnet rotating electric machine 1.

The magnetic slit 25 is formed of a material having a lower magnetic permeability than that of the rotor core 21, and has an elongated shape extending from a vicinity of the permanent magnets 22 to a vicinity of the gap 50.

The magnetic slit 25 is formed with an inclination in a region of the rotor core 21, which is located between the permanent magnets 22 for forming one magnetic pole and the gap 50. The magnetic slit 25 is formed so that one of ends in the longitudinal direction, which is located at a position closer to the outer periphery of the rotor 20 than another end, is located in a portion of the region of the rotor core 21, which is located between the same direction side as the direction of the force applied to the rotor 20 by energization of the coil 12 at the time of the regeneration operation and a magnetic pole center being a center of a magnetic pole for forming one magnetic pole. Further, the magnetic slit 25 is formed so that the another end in the longitudinal direction, which is located at a position closer to the rotation axis center of the rotor 20 than the one end, is positioned on the magnetic pole center or in a portion of the region of the rotor core 21, which is located between a side opposite to the direction of the force in the circumferential direction and the magnetic pole center, the force being applied to the rotor 20 described above through the torque.

The rotor core region located between the permanent magnets 22 for forming one magnetic pole and the gap 50 is separately described as a region located between the same direction side as the direction of the force described above and the magnetic slit 25 and a region located between the side opposite to the direction of the force described above and the magnetic slit 25. In this case, an area of the region between the same direction side as the direction of the force described above and the magnetic slit 25 is smaller than an area of the region between the side opposite to the direction of the force described above and the magnetic slit 25. Each of the regions is formed by, for example, an outer peripheral side of the rotor 20, magnetic flux generation sides of the magnet 22, and the magnetic slit 25.

An end point on the end of the magnetic slit 25, which is closer to the rotation axis, is represented as an end point A, and an end point on the outer periphery side is represented as an end point B. An intersection point between an extension line of a straight line AB being a straight line for imaginarily connecting the end point A and the end point B and the surface of the rotor 20 on the extension line is represented as an intersection point C. The ends herein mean end sides of the magnetic slit 25 in the longitudinal direction, and the end point A herein is set to a point closest to the magnet side or an extension line of the magnet side on the end of the magnetic slit. When there are a plurality of points which may be the end point A, a point located in the center or a point closest to the center in arrangement of the points is set as the end point A. Further, the end point B is represented as a point closet to the surface of the rotor 20 on the end. When there are a plurality of points which may be the end point B, a point located in the center or a point closest to the center in arrangement of the points is set as the end point B.

When the rotation axis center of the rotor 20 is represented by a rotation axis center O, a line for imaginarily connecting the intersection point C and the rotation axis center O is represented as a straight line OC. An intersection point between an extension line of a straight line for imaginarily connecting an end point on an end side of the permanent magnet 22 located on a forward side in the rotating direction of the rotor 20, which is located on a radially outermost side, and the rotation axis center O, and the surface of the rotor 20 on the extension line, is represented as an intersection point D. An intersection point between an extension line of a straight line for imaginarily connecting an end point on an end side of the permanent magnet 22 located on a backward side of the straight line OC in the rotating direction, which is located on a radially outermost side, and the rotation axis center O, and the surface of the rotor 20 on the extension line is represented as an intersection point E.

In the permanent magnets 22 for forming one magnetic pole, a total length being a sum of a length of a portion of the magnetic flux generation side of the magnet, which is located on the forward side of the straight line AB in the rotating direction at the time of the regeneration operation, is represented by X. Further, a total length being a sum of lengths of all portions of the magnetic flux generation sides of the magnets, which are located on the backward side of the straight line AB in the rotating direction at the time of the regeneration operation, is represented by Y. In this case, a shape of the magnetic slit 25 satisfies Expression (2) using an arc CD for connecting the intersection point C and the intersection point D, the total length X, an arc CE for connecting the intersection point C and the intersection point E, and the total length Y.

[Math. 2]

$$\frac{X}{\text{arc } CD} < \frac{Y}{\text{arc } CE} \qquad (2)$$

Further, description is made with the rotor core 21, which is located between the permanent magnets 22 and the gap 50, being divided by the straight line AB into a rotating-direction forward side core region 21A at the time of the regeneration operation and a rotating-direction backward side core region 21B at the time of the regeneration operation. In this case, an area of the rotating-direction forward side core region 21A is larger than an area of the rotating-direction backward side core region 21B.

Now, a state of the magnetic fluxes being sources of generation of the torque is described with reference to FIG. 7. The magnet magnetic flux 31 generated from the magnetic flux generation sides of the permanent magnets 22 located on the backward side of the straight line AB in the rotating direction at the time of the regeneration operation is likely to flow from the rotor core 21 to the gap 50. However, a direction of the magnetic flux is restricted by the magnetic slit 25 having a lower magnetic permeability than that of the rotor core 21.

Specifically, the magnet magnetic flux 31 is localized in the rotating-direction backward side core region 21B. As a result, the current phase angle β at which the magnet torque has a negative peak value can be reduced to be smaller than the related-art current phase angle β.

Further, a path of the reluctance magnetic flux 32, which is likely to flow from the stator core 11 via the gap 50, is restricted by the magnetic slit 25 having a lower magnetic permeability than that of the rotor core 21, and the reluctance magnetic flux 32 passes through the rotating-direction forward side core region 21A while avoiding the rotating-direction backward side core region 21B. As a result, the current phase angle at which the reluctance torque has a negative peak value can be increased to be larger than the related-art current phase angle.

In addition, the area of the rotating-direction forward side core region 21A is larger than the area of the rotating-direction backward side core region 21B. Thus, even when the magnetic slit 25 is formed, the reluctance magnetic flux 32 is not reduced. Thus, the reluctance torque equal to that in a case without the magnetic slit 25 can be generated.

Thus, even when a structure is changed by forming the magnetic slit 25 in a range which meets a relation condition between the area of the rotating-direction forward side core region 21A and the area of the rotating-direction backward side core region 21B described above or satisfies Expression (2), the differential between the current phase angle for the magnet torque and the current phase angle for the reluctance torque can be reduced. Thus, the total torque of the magnet torque and the reluctance torque of the permanent magnet rotating electric machine while performing the regeneration operation can be improved.

In the first embodiment and the second embodiment, it has been described as an example with reference to FIG. 2 and FIG. 6 that the rotor 20 has twelve magnetic poles and the stator 10 has eighteen tooth portions 112, specifically, the ratio of the number of magnetic poles to the number of slots is 2:3. However, the ratio of the number of magnetic poles to the number of slots is not always required to be 2:3. The ratio of the number of magnetic poles to the number of slots may be, for example, 8:9 or 10:12. The ratio of 8:9 or the ratio of 10:12 has a higher effect in increase in winding factor in comparison to the ratio of 2:3, and can improve the torque and suppress a torque pulsation.

Figure 8:
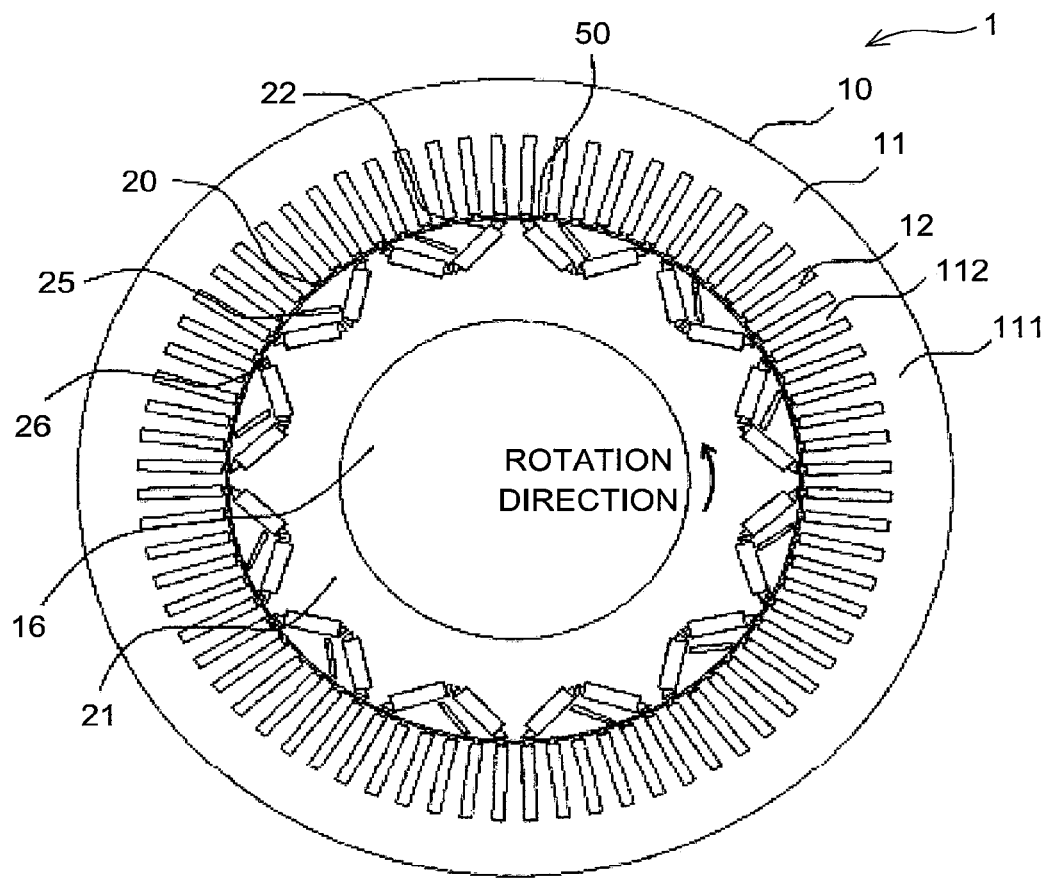
FIG. 8 is a sectional view of a modification example of the permanent magnet rotating electric machine, which is taken along the line A-A perpendicular to the rotation axis direction and is an illustration of the basic structure according to the first embodiment of the present invention.

Further, as illustrated in FIG. 8, a structure of the stator 10 may be a distributed winding structure having seventy-two teeth. The distributed winding structure is a structure in which a coil is formed through winding between a slot and a slot away from an adjacent slot. The arrangement of the coils is changed based on a combination of the number of magnetic poles and the number of slots. Further, the rotating electric machine may have the ratio of the number of magnetic poles to the number of slots other than that illustrated in FIG. 8. Even in this case, a torque improvement effect similar to the concentrated winding structure described above can be expected. When the magnetic slits 25 are formed, however, the concentrated winding structure is superior to the distributed winding structure in terms of exertion of the reluctance torque.

Figure 9:
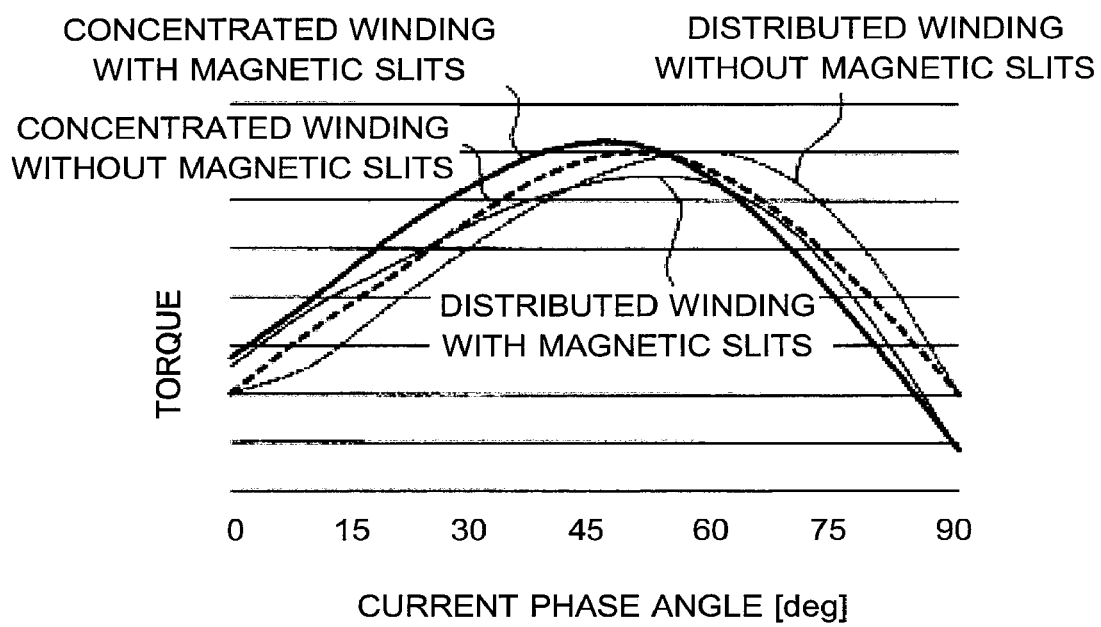
FIG. 9 is a graph for showing the relationship between the phase and the torque according to the first embodiment of the present invention for each kind of winding.

FIG. 9 is a graph for showing results of the torque with respect to the current phase angle β, which is analyzed under a condition in which the current value is constant with use of a finite element method for each of the concentrated winding structure of FIG. 2 and the distributed winding structure of FIG. 8. In each of the concentrated winding structure and the distributed winding structure, the permanent magnets 22 are removed in the regions and the regions in which the permanent magnets 22 are removed are formed as the flux barriers 26. Specifically, the analysis was carried out under a condition that the magnet torque was not generated and only the reluctance torque was generated.

A horizontal axis of the graph of FIG. 9 represents the current phase angle β, and a vertical axis represents the torque. Results indicated by the dotted lines on the graph are results without the magnetic slits 25, and results indicated by the solid lines are results with the magnetic slits 25.

In the concentrated winding structure, in a case in which the magnetic slits 25 are formed, a maximum value of the reluctance torque with respect to the current phase angle β is larger than that in a case in which the magnetic slits 25 are not formed. Meanwhile, in the distributed winding structure, in the case in which the magnetic slits 25 are formed, a maximum value of the reluctance torque with respect to the current phase angle β is smaller than that in the case in which the magnetic slits 25 are not formed. Even in the concentrated winding structure with which the reluctance torque has not hitherto been fully exerted, the path of the reluctance magnetic flux is changed by the magnetic slits 25 to improve the reluctance torque. Further, although not shown, the rotating electric machine may have an outer rotor structure.

Figure 10:
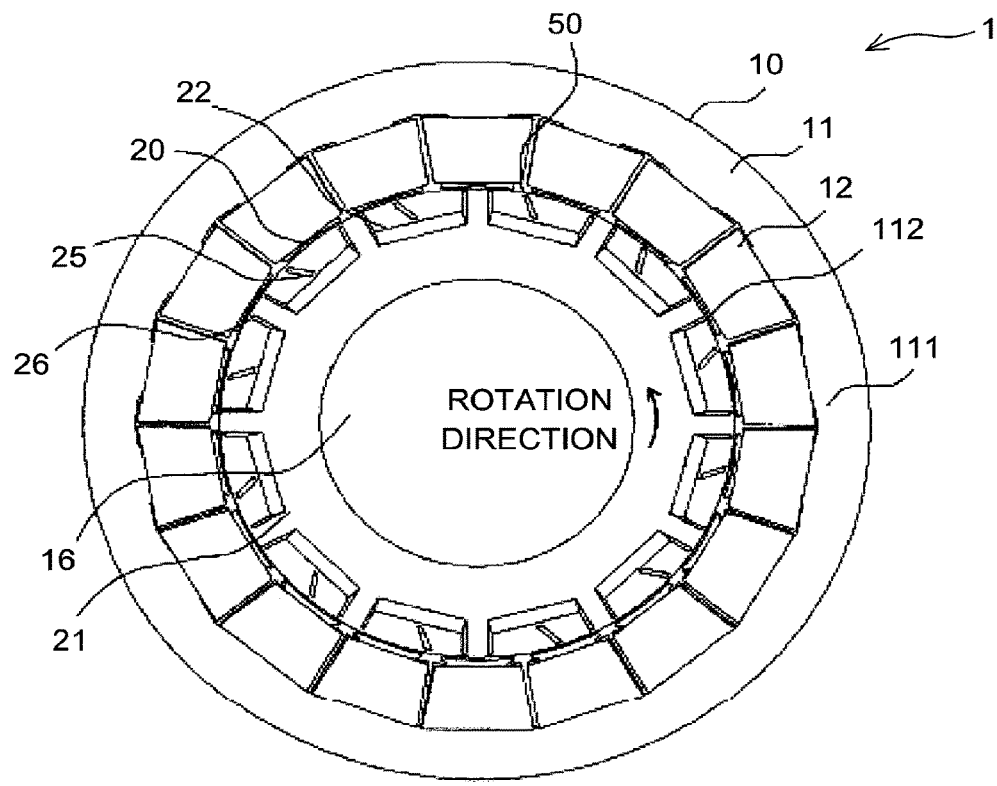
FIG. 10 is a sectional view of a modification example of the permanent magnet rotating electric machine, which is taken along the line A-A perpendicular to the rotation axis direction and is an illustration of the basic structure according to the first embodiment of the present invention.
Figure 11:
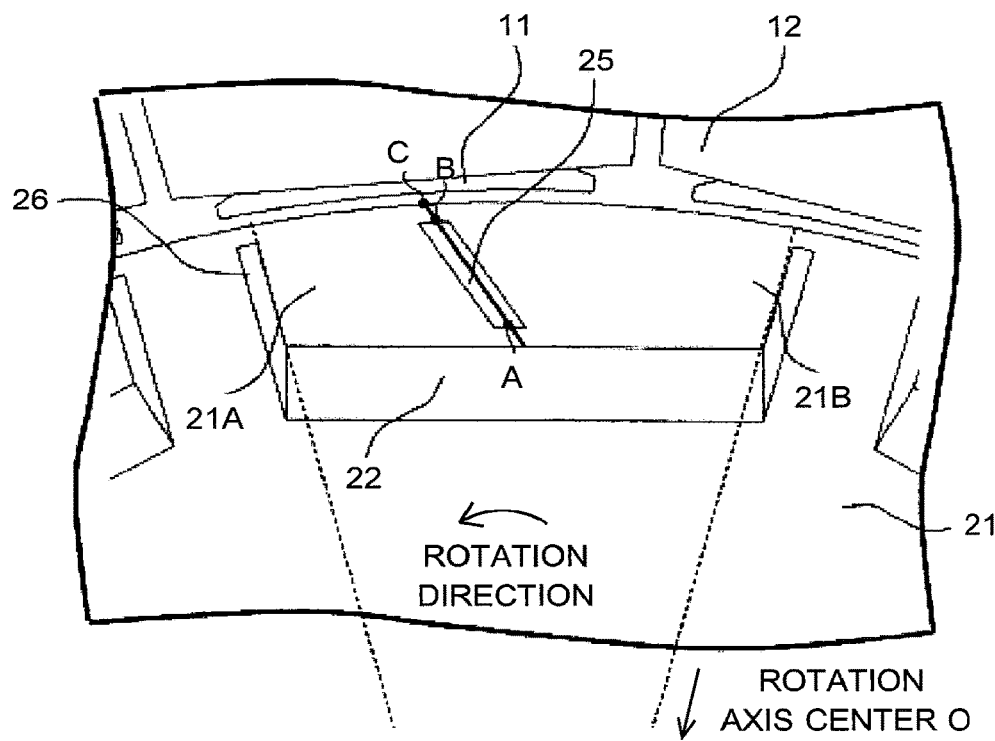
FIG. 11 is a view for illustrating a main part of the modification example of the permanent magnet rotating electric machine, which is an illustration of the basic structure according to the first embodiment of the present invention.
Figure 12:
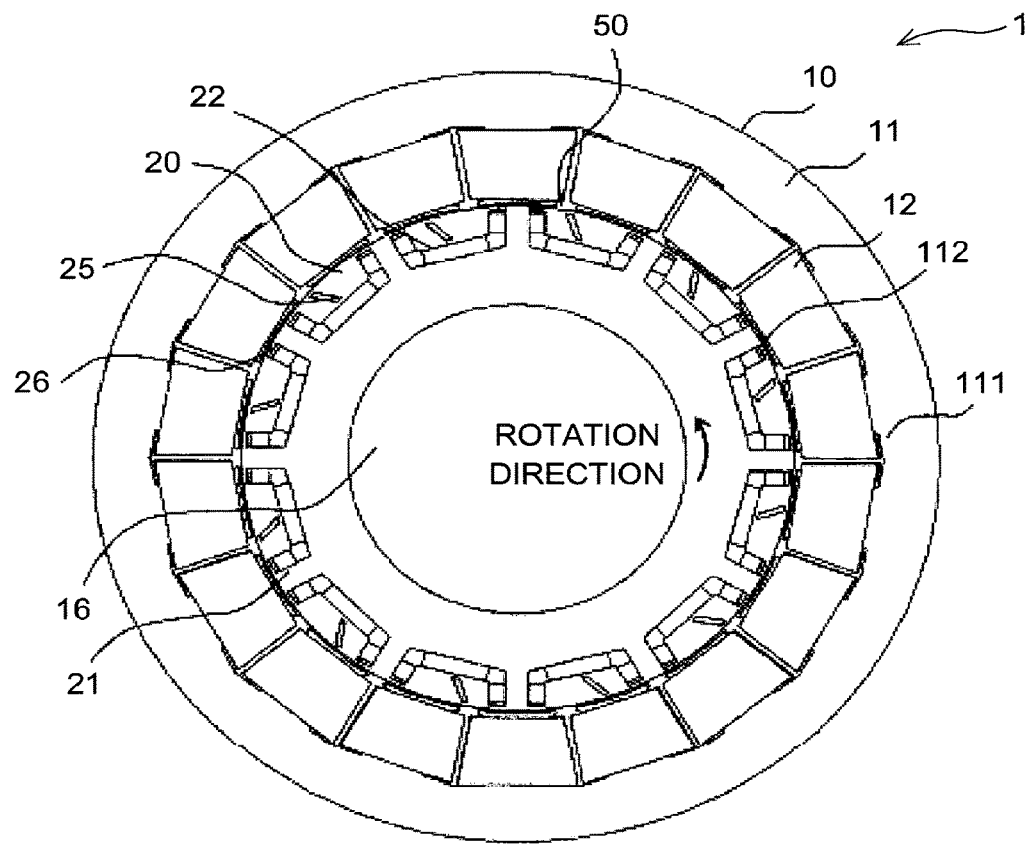
FIG. 12 is a sectional view of a modification example of the permanent magnet rotating electric machine, which is taken along the line A-A perpendicular to the rotation axis direction and is an illustration of the basic structure according to the first embodiment of the present invention.
Figure 13:
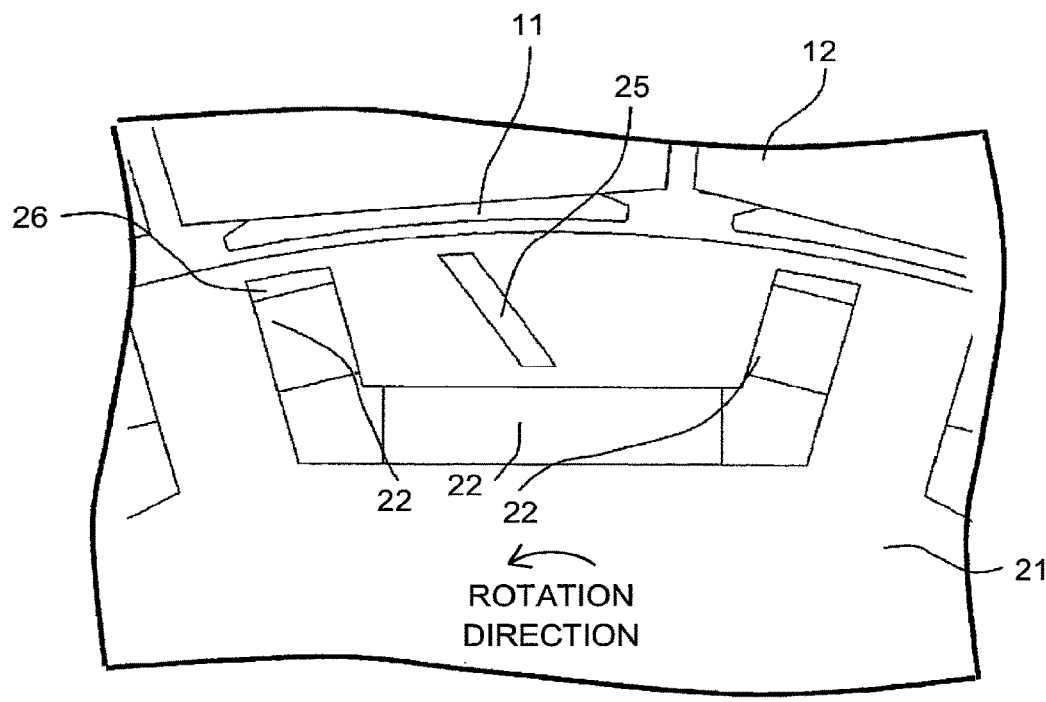
FIG. 13 is a view for illustrating a main part of the modification example of the permanent magnet rotating electric machine, which is an illustration of the basic structure according to the first embodiment of the present invention.

Further, for example, the number of permanent magnets 22 for forming one magnetic pole, and a shape or a position of each of the permanent magnets 22 may be changed. For example, even when the number of permanent magnets 22 for forming one magnetic pole is set to one as illustrated in FIG. 10 and FIG. 11 and even when the number of permanent magnets 22 for forming one magnetic pole is set to three as illustrated in FIG. 12 and FIG. 13, the same effects as those attained with each of the structures of the first embodiment and the second embodiment are attained.

Figure 14:
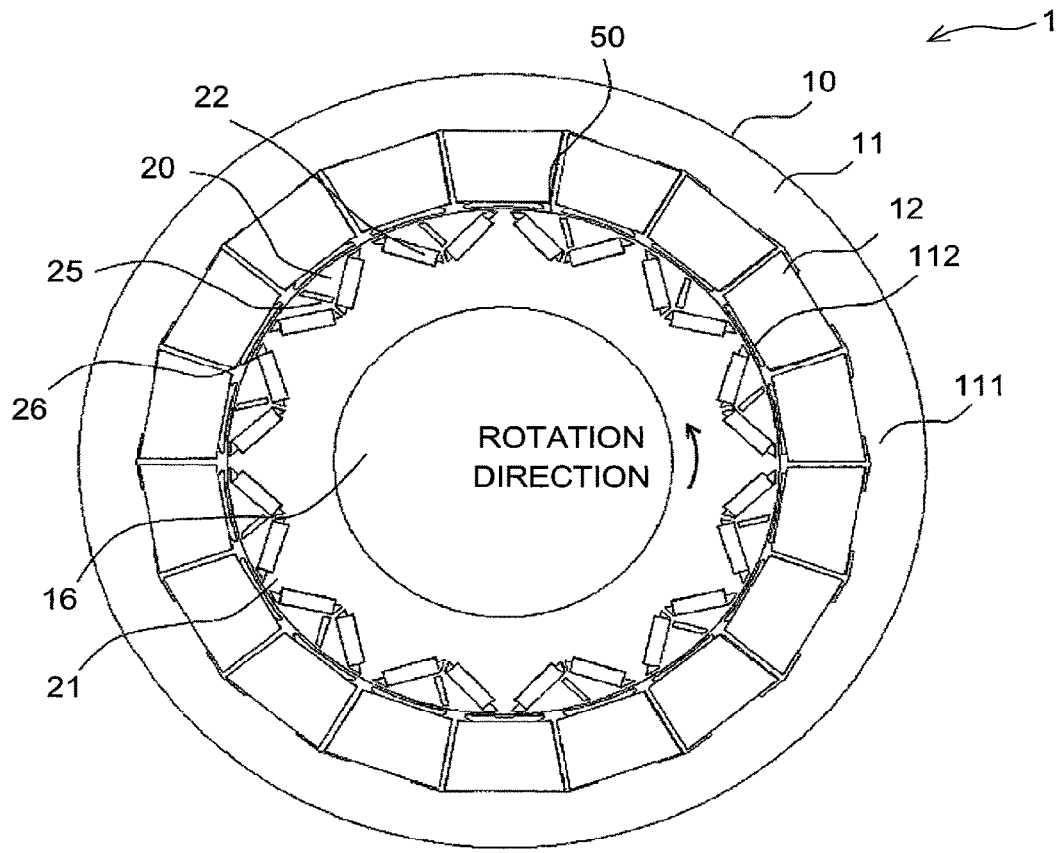
FIG. 14 is a sectional view of a modification example of the permanent magnet rotating electric machine, which is taken along the line A-A perpendicular to the rotation axis direction and is an illustration of the basic structure according to the first embodiment of the present invention.
Figure 15:
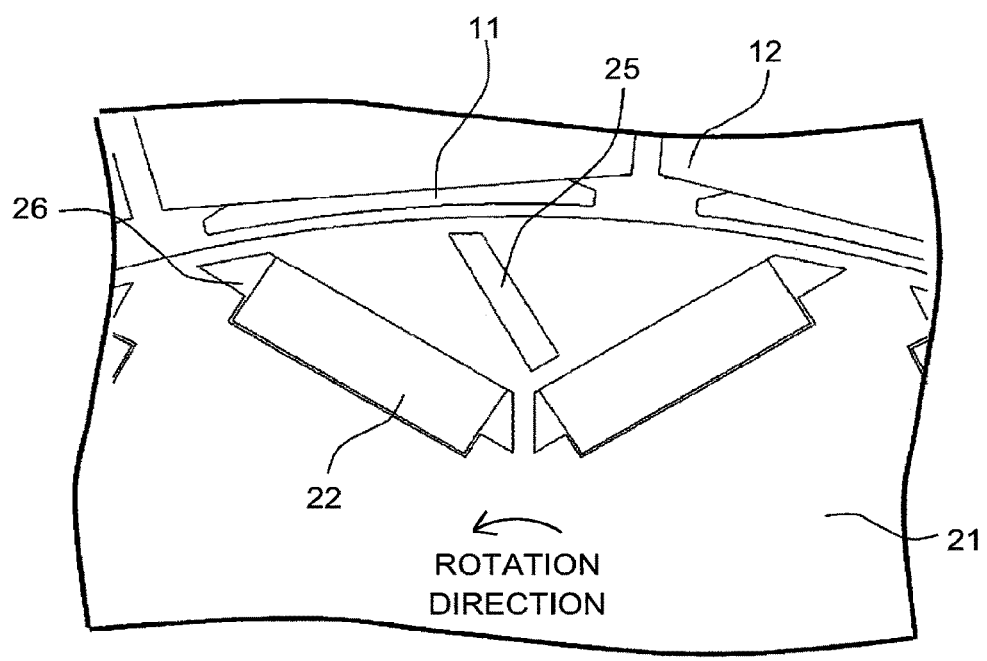
FIG. 15 is a view for illustrating a main part of the modification example of the permanent magnet rotating electric machine, which is an illustration of the basic structure according to the first embodiment of the present invention.
Figure 16:
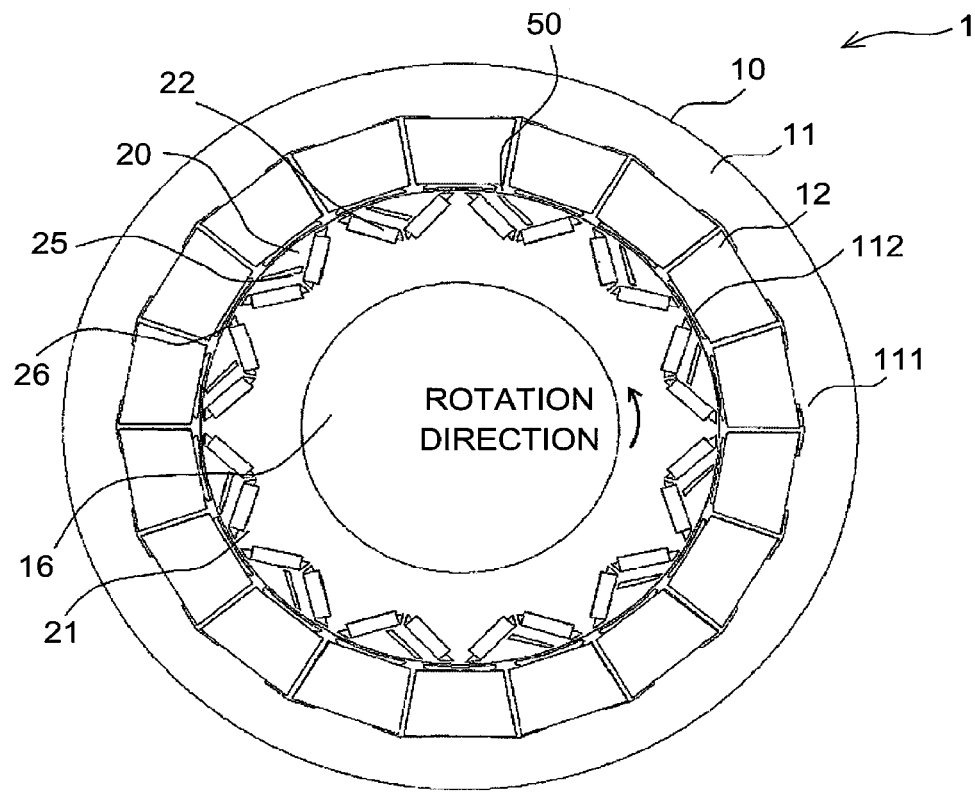
FIG. 16 is a sectional view of a modification example of the permanent magnet rotating electric machine, which is taken along the line A-A perpendicular to the rotation axis direction and is an illustration of the basic structure according to the first embodiment of the present invention.
Figure 17:
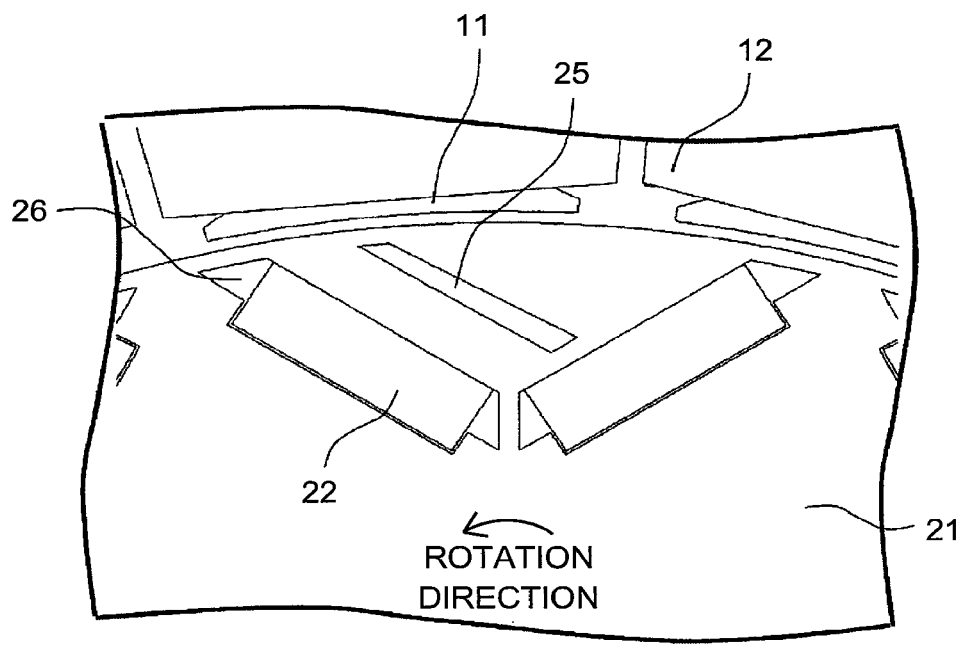
FIG. 17 is a view for illustrating a main part of the modification example of the permanent magnet rotating electric machine, which is an illustration of the basic structure according to the first embodiment of the present invention.

Further, as illustrated in FIG. 14 and FIG. 15 for illustrating a modification example of the permanent magnet rotating electric machine 1 according to the present invention, an inclination angle of each of the magnetic slits 25 with respect to the rotating direction may be reduced. Further, as illustrated in FIG. 16 and FIG. 17, an inclination angle of each of the magnetic slits 25 with respect to the rotating direction may be increased. When the inclination angle of the magnetic slit 25 is suitably changed with the above-mentioned conditions for the position at which the magnetic slit 25 is formed being met, an effect of effectively exerting a high torque is fulfilled without causing magnetic saturation with the magnet magnetic flux 31 in the rotating-direction forward side core region 21A. It is more preferred to suitably adjust the change of the inclination angle of the magnetic slit 25 to such a degree that the magnetic saturation is not caused.

Figure 18:
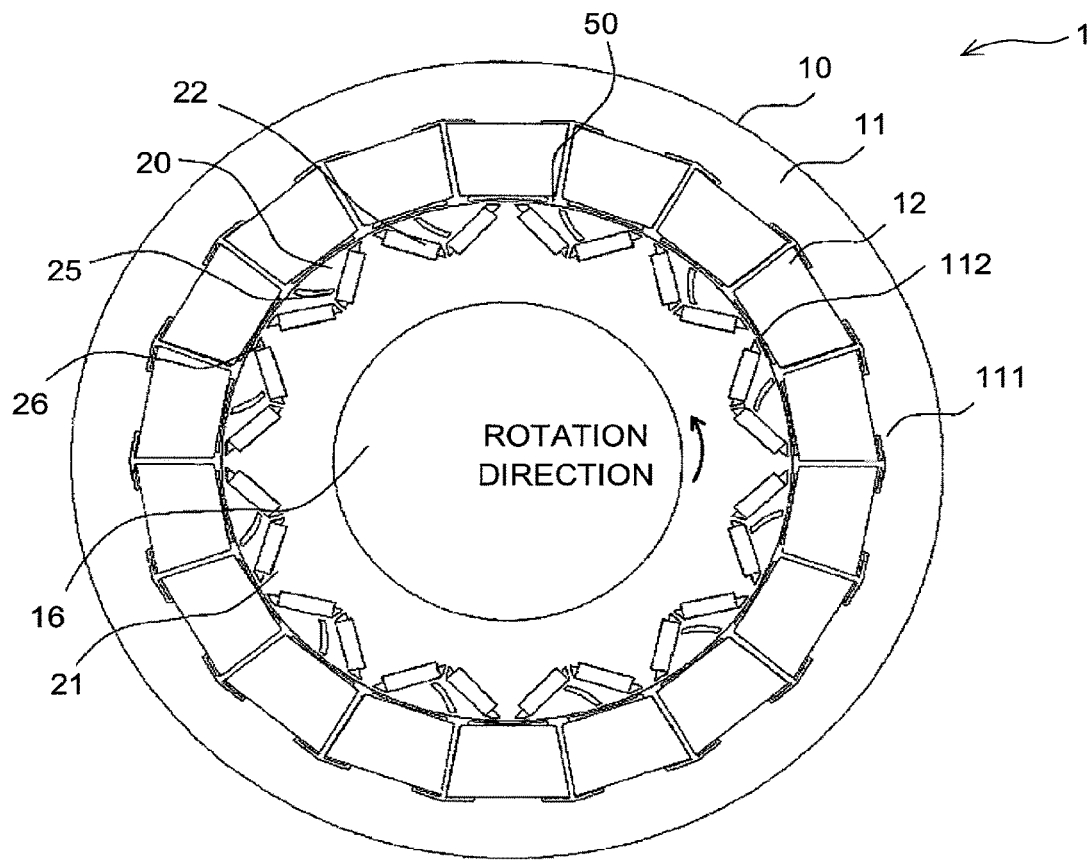
FIG. 18 is a sectional view of a modification example of the permanent magnet rotating electric machine, which is taken along the line A-A perpendicular to the rotation axis direction and is an illustration of the basic structure according to the first embodiment of the present invention.
Figure 19:
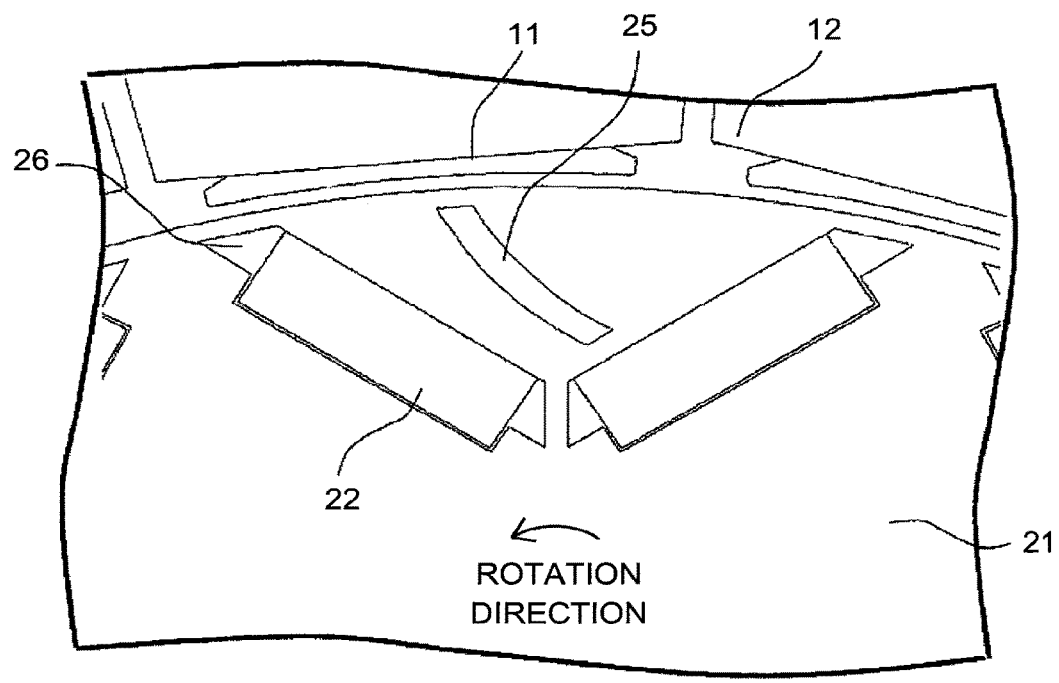
FIG. 19 is a view for illustrating a main part of the modification example of the permanent magnet rotating electric machine, which is an illustration of the basic structure according to the first embodiment of the present invention.
Figure 20:
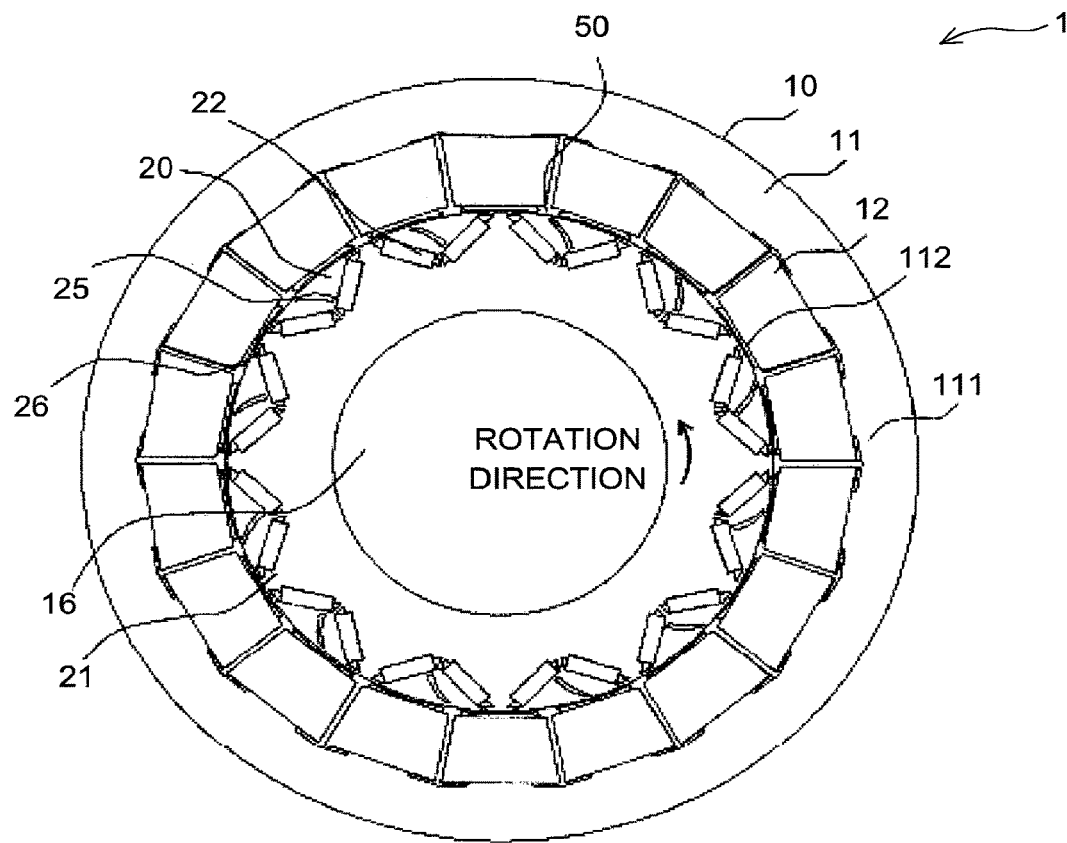
FIG. 20 is a sectional view of a modification example of the permanent magnet rotating electric machine, which is taken along the line A-A perpendicular to the rotation axis direction and is an illustration of the basic structure according to the first embodiment of the present invention.
Figure 21:
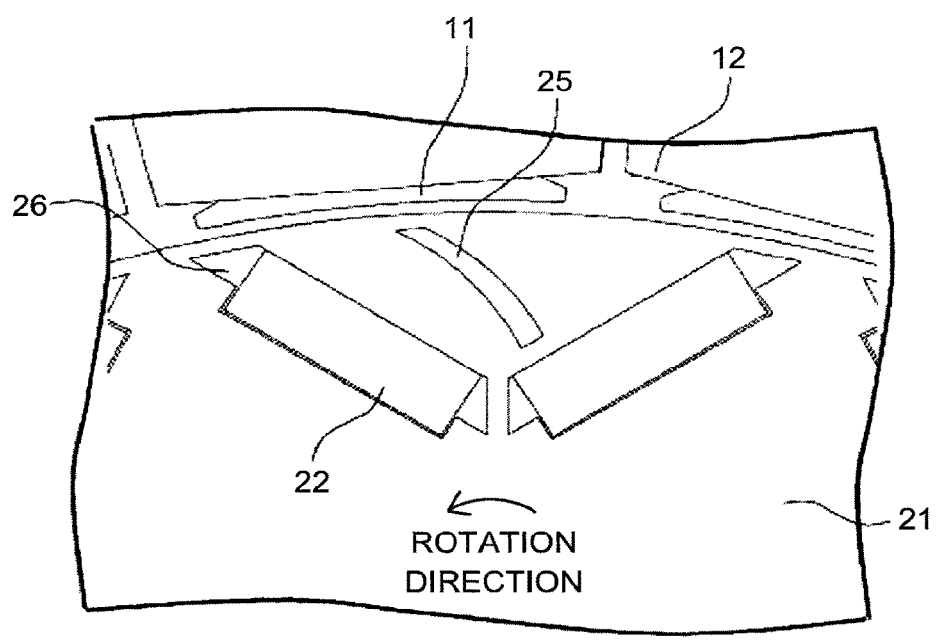
FIG. 21 is a view for illustrating a main part of the modification example of the permanent magnet rotating electric machine, which is an illustration of the basic structure according to the first embodiment of the present invention.

Further, as illustrated in FIG. 18 and FIG. 19 for illustrating a modification example of the permanent magnet rotating electric machine 1 according to the present invention, each of the magnetic slits 25 may be formed in a curved shape being convex toward the rotation axis center side instead of being formed linearly, or as illustrated in FIG. 20 and FIG. 21, each of the magnetic slits 25 may be formed in a curved shape being convex toward the outer periphery side instead of being formed linearly. Even in this case, with the above-mentioned conditions for the position at which the magnetic slit 25 is formed being met, the shape of each of the magnetic slits 25 is suitably changed. As a result, the effect of effectively exerting a high torque is fulfilled by suitably changing the shape of each of the magnetic slits 25 without causing the magnetic saturation with the magnet magnetic flux 31.

Figure 22:
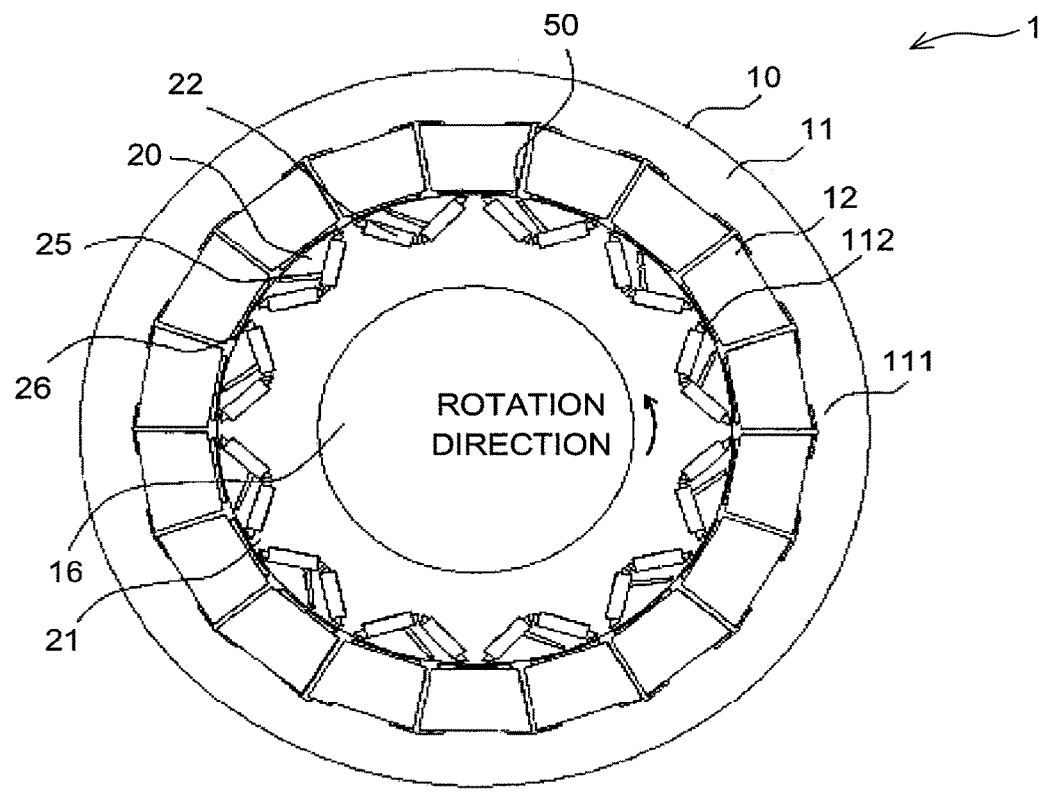
FIG. 22 is a sectional view of a modification example of the permanent magnet rotating electric machine, which is taken along the line A-A perpendicular to the rotation axis direction and is an illustration of the basic structure according to the first embodiment of the present invention.
Figure 23:
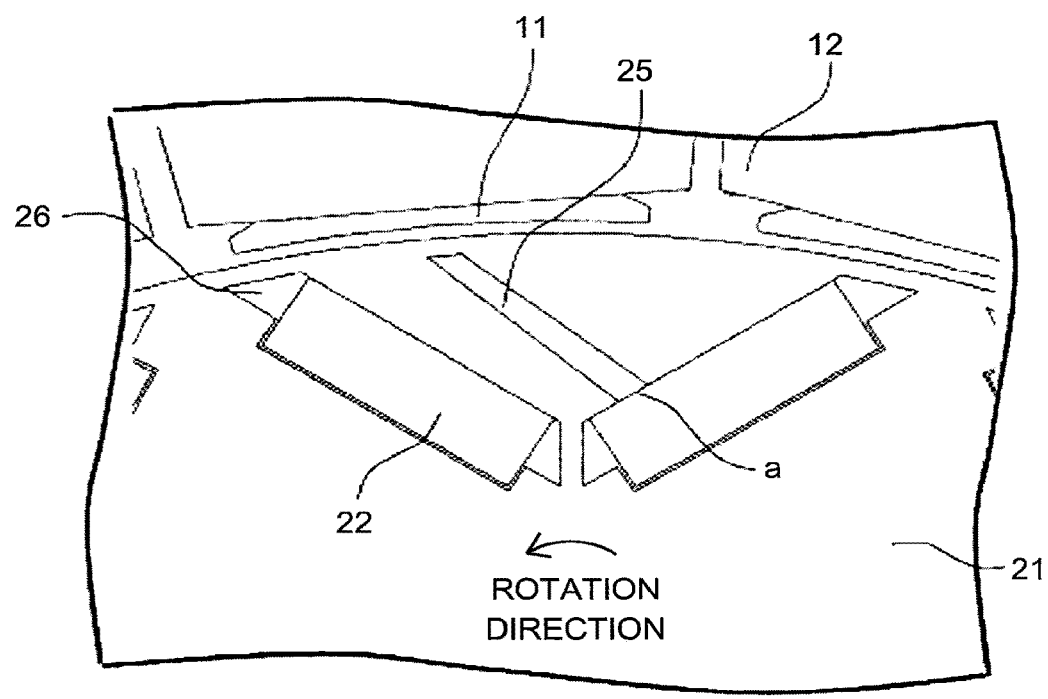
FIG. 23 is a view for illustrating a main part of the modification example of the permanent magnet rotating electric machine, which is an illustration of the basic structure according to the first embodiment of the present invention.
Figure 24:
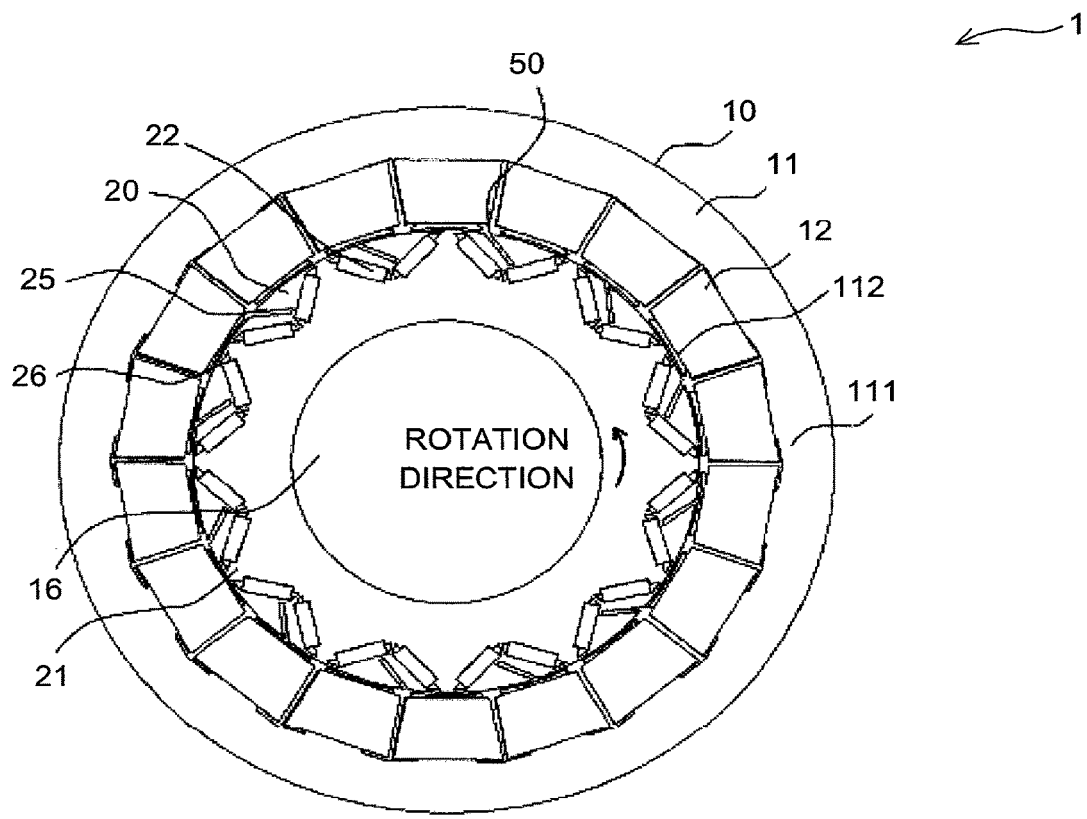
FIG. 24 is a sectional view of a modification example of the permanent magnet rotating electric machine, which is taken along the line A-A perpendicular to the rotation axis direction and is an illustration of the basic structure according to the first embodiment of the present invention.
Figure 25:
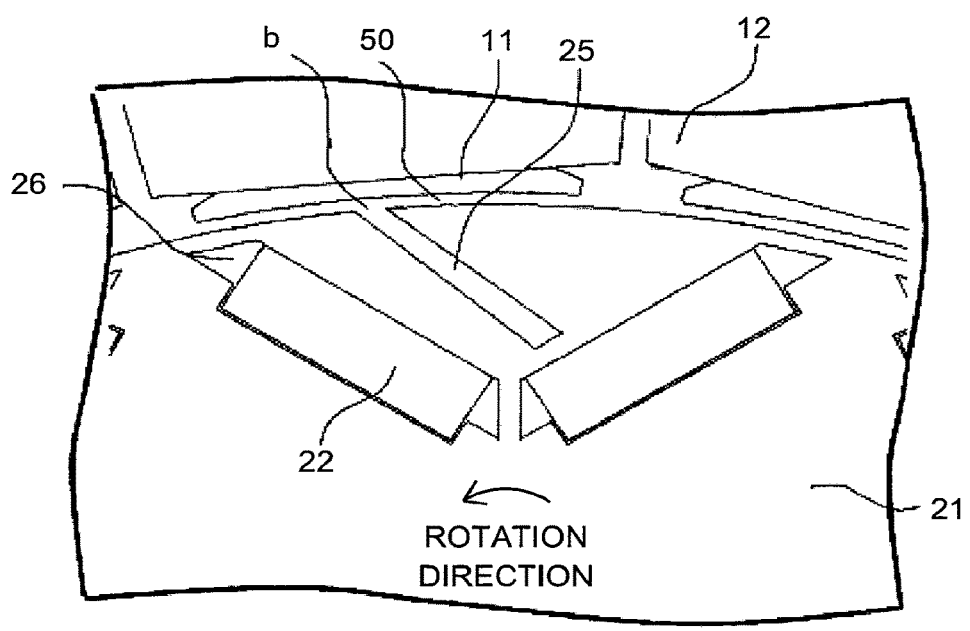
FIG. 25 is a view for illustrating a main part of the modification example of the permanent magnet rotating electric machine, which is an illustration of the basic structure according to the first embodiment of the present invention.
Figure 26:
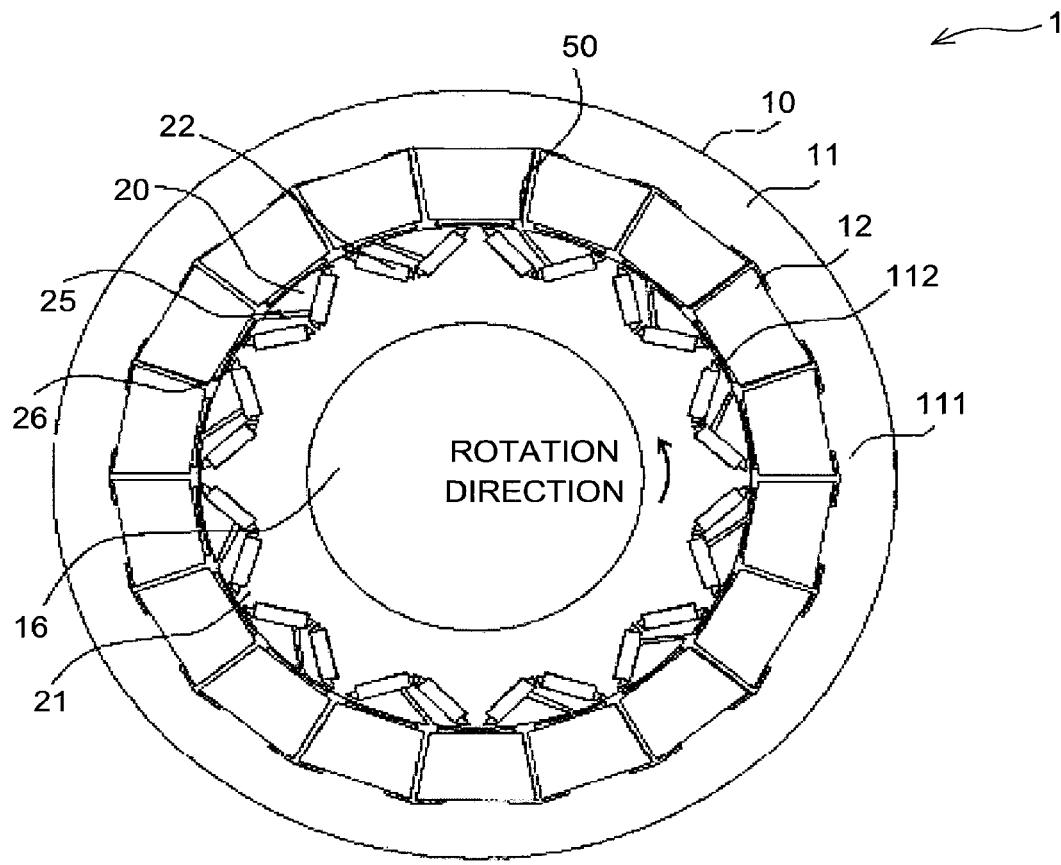
FIG. 26 is a sectional view of a modification example of the permanent magnet rotating electric machine, which is taken along the line A-A perpendicular to the rotation axis direction and is an illustration of the basic structure according to the first embodiment of the present invention.
Figure 27:
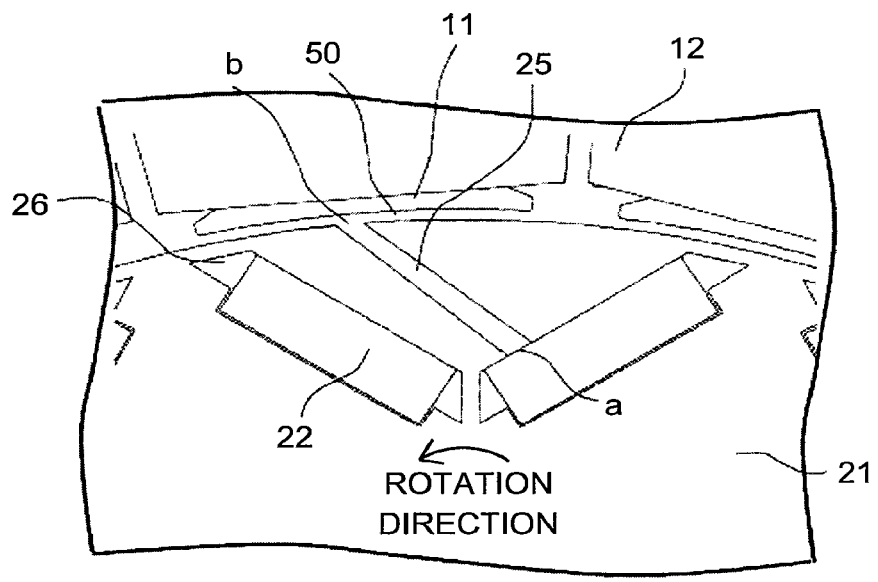
FIG. 27 is a view for illustrating a main part of the modification example of the permanent magnet rotating electric machine, which is an illustration of the basic structure according to the first embodiment of the present invention.

Further, the magnetic slit 25 may have such a shape that a rotation axis center side end point a of the magnetic slit 25 is in contact with the permanent magnet 22 or the flux barrier 26, as illustrated in FIG. 22 and FIG. 23, or may have such a shape that an outer periphery side end point b of the magnetic slit 25 is in contact with the gap 50, as illustrated in FIG. 24 and FIG. 25. Further, the magnetic slit 25 may have such a shape that the outer periphery side endpoint b of the magnetic slit 25 is in contact with the gap 50 and the rotation axis center side end point a of the magnetic slit 25 is in contact with the permanent magnet 22 or the flux barrier 26, as illustrated in FIG. 26 and FIG. 27. In this manner, in addition to the above-mentioned effect of improving the torque, a leakage magnetic flux can be suppressed to exert a high torque.

Further, in the first embodiment and the second embodiment, longitudinal lengths of the two permanent magnets 22 for forming the V shape are set equal to each other. With the setting of the same size for the permanent magnets 22, cost for magnets can be reduced.

Further, the kinds of the two permanent magnets 22 may be changed. For example, when a residual flux density of the permanent magnet 22 on the side of generation of the direction of the force in the circumferential direction, which is applied to the rotor 20 by the energization of the coils 12, is increased, the gap magnetic flux density in one magnetic pole deviates in the rotating direction of the rotor 20 at the time of the power running operation and deviates in the direction opposite to the rotating direction of the rotor 20 at the time of the regeneration operation. Thus, the differential between the current phase angle β at which the magnet torque has the peak value and the current phase angle β at which the reluctance torque has the peak value can be reduced, and hence the total torque can be further improved.

Further, an inner rotor type structure has been described in the first embodiment and the second embodiment. However, the present invention may also be applied to an outer rotor type structure.

Third Embodiment

A third embodiment is different from the first embodiment in the configuration of the rotor core 21. This embodiment is described below while omitting description of the same configurations as those of the first embodiment.

Figure 28:
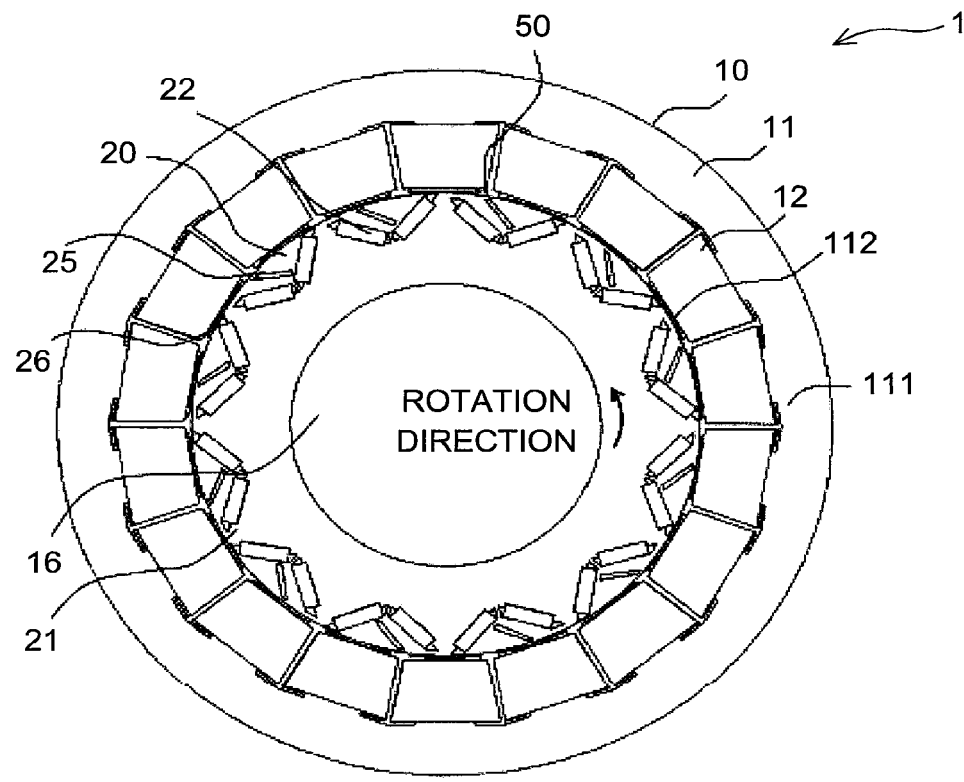
FIG. 28 is a sectional view of a permanent magnet rotating electric machine taken along the line A-A perpendicular to a rotation axis direction, which is an illustration of a basic structure according to a third embodiment of the present invention.

FIG. 28 is a sectional view taken along the line A-A perpendicular to a rotation axis direction, which is an illustration of a basic structure of a permanent magnet rotating electric machine according to the third embodiment of the present invention. In FIG. 28, the configurations denoted by the same reference symbols as those of FIG. 2 are the same or corresponding configurations, and description thereof is herein omitted.

The permanent magnet rotating electric machine 1 illustrated in FIG. 28 includes, similarly to the first embodiment, the stator 10 and the rotor 20 having a columnar shape, which is arranged on an inner side of the stator 10. The rotor 20 is arranged so as to be spaced apart from the stator 10 through a gap 50 being a micro-gap therebetween, and hence the rotor 20 is configured so as to be rotatable.

The stator 10 includes the stator core 11 and the coils 12. The stator core 11 has, for example, a cylindrical shape, and is formed in a cylindrical shape by, for example, laminating a plurality of thin electromagnetic steel plates, each having an annular shape, in an axial direction of the rotary shaft of the rotor 20.

The rotor 20 includes the rotor core 21, the twenty-four permanent magnets 22, and the rotary shaft 16. The rotary shaft 16 is fixed to the center of the rotor core 21, and has both ends supported by the bearings 14 (not shown) provided to the brackets 15 (not shown) of the frame 13 (not shown) so as to be rotatable.

The rotor 20 is rotated around the above-mentioned rotation axis as its center by energization of the coils 12 to form a rotating electric field. A rotating direction in this embodiment is described as a counterclockwise direction. Further, the permanent magnet rotating electric machine 1 according to this embodiment is to be used for a power running operation.

The permanent magnet rotating electric machine according to this embodiment is described as being used for the power running operation as in the first embodiment. When the permanent magnet rotating electric machine according to this embodiment is used for the regeneration operation, the same configuration as that of the second embodiment is used in this embodiment so that the permanent magnet rotating electric machine is used for the regeneration operation.

Further, in this embodiment, description is made with an example in which the stator 10 has eighteen tooth portions 112 and the rotor 20 has twelve magnetic poles, specifically, a ratio of the number of magnetic poles to the number of slots is 2:3.

Figure 29:
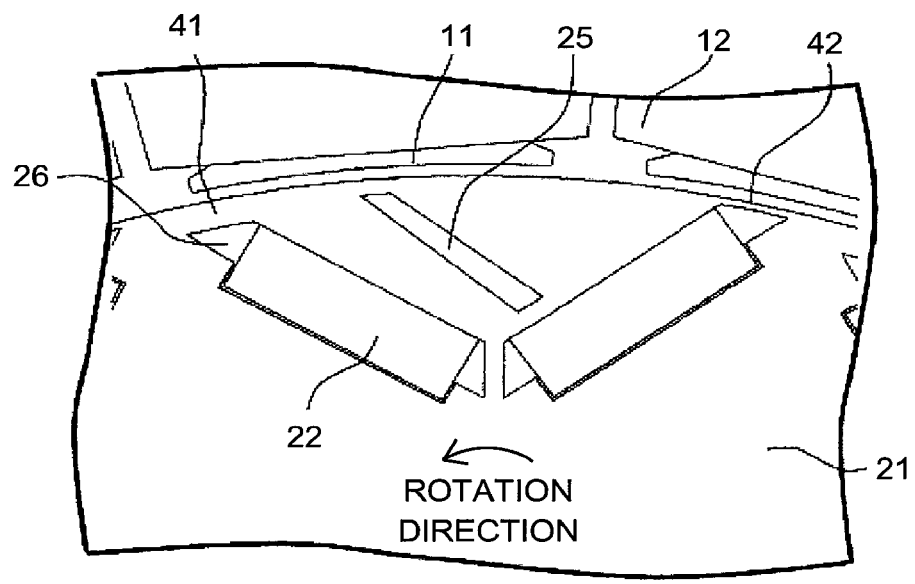
FIG. 29 is a view for illustrating a main part of the permanent magnet rotating electric machine, which is an illustration of the basic structure according to the third embodiment of the present invention.

Description is made in further detail with reference to FIG. 29. FIG. 29 is an enlarged view of FIG. 28 mainly for a part of the rotor 20, which forms one magnetic pole, in the permanent magnet rotating electric machine 1.

The rotor core 21 includes the flux barriers 26 as illustrated in FIG. 29. The flux barriers are formed so that such an interlinkage path of the magnet magnetic flux as to be closed in the rotor core 21 is suppressed and the magnet magnetic flux is likely to be interlinked with the stator 10 side via the gap 50. In this embodiment, the flux barriers 26 are formed at magnet ends of each of the permanent magnets 22, each of the permanent magnets 22 having a rectangular shape, in the longitudinal direction. Specifically, each of the permanent magnets 22 is embedded in a hole formed in the rotor core 21 in such a manner that both ends thereof in the longitudinal direction are sandwiched between the flux barriers 26. As described in the modification examples of the first embodiment, the shape of each of the permanent magnets 22 can be changed, and a positional relationship between the flux barriers 26 and the permanent magnet 22 described in this embodiment can be changed. Further, in this embodiment, one of the flux barriers 26 formed for each of the permanent magnets 22, which is located at the end on the rotation axis center side, may be omitted.

A portion of the rotor core 21, which is located between the flux barriers 26 and the gap 50, includes a forward-side outer bridge 41 and a backward-side outer bridge 42. The forward-side outer bridge 41 is located on the forward side in the rotating direction in the power running operation, and the backward-side outer bridge 42 is located on the backward side in the rotating direction in the power running operation.

In this embodiment, as illustrated in FIG. 29, a thickness of the forward-side outer bridge 41 in a radial direction of the rotor core 21 is larger than a thickness of the backward-side outer bridge 42 in the radial direction. With the thicknesses described above, a phase of the magnet magnetic flux 31 in the rotating-direction forward-side core region 21A is moved to the forward side in the rotating direction. As a result, a higher torque can be exerted.

Figure 30:
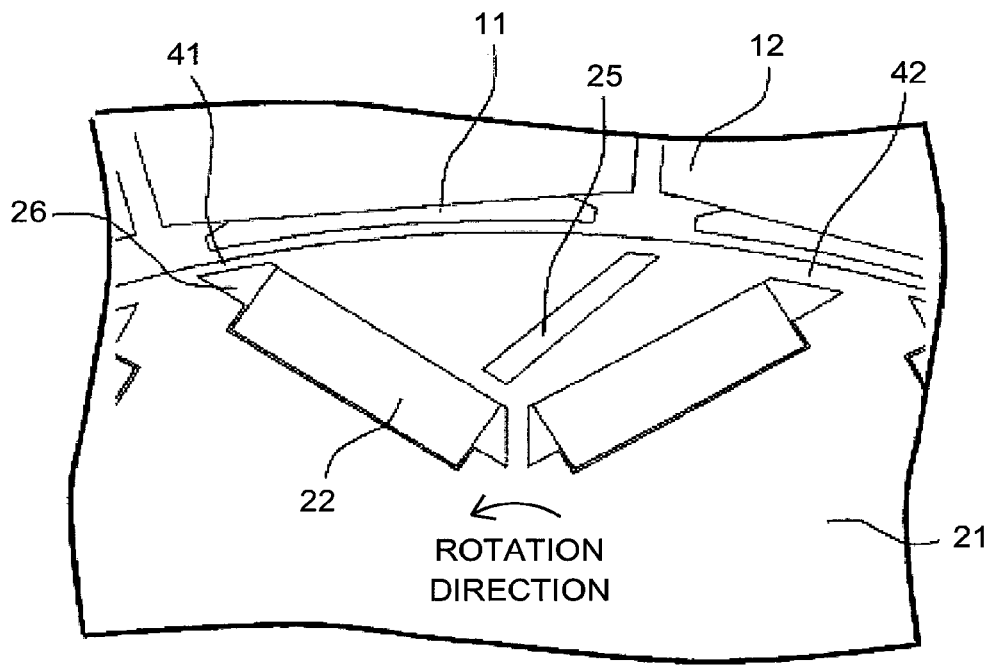
FIG. 30 is a view for illustrating a main part of a modification example of the permanent magnet rotating electric machine, which is an illustration of the basic structure according to the third embodiment of the present invention.

Further, when the permanent magnet rotating electric machine having the configuration corresponding to the second embodiment is used for the regeneration operation, the thickness of the backward-side outer bridge 42 in the radial direction may be larger than the thickness of the forward-side outer bridge 41 in the radial direction, as illustrated in FIG. 30. Even in this case, the magnet magnetic flux 31 passing through the outer bridges 41 and 42 may be localized in magnitude.

Specifically, the thickness of one of the outer bridges 41 and 42 in the radial direction, which is located in a direction of inclination of the magnetic slit 25 from the rotation axis center side of the rotor 20 toward the outer periphery side of the rotor 20, is increased to change the magnet magnetic flux 31.

Thus, the magnet magnetic flux can be localized by changing the thicknesses of the outer bridges 41 and 42 in the radial direction. Hence, a high torque can be effectively exerted.

Therefore, in addition to the same effect of improving the torque as that obtained in the first embodiment, a high torque can be more effectively exerted.

Fourth Embodiment

Figure 31:
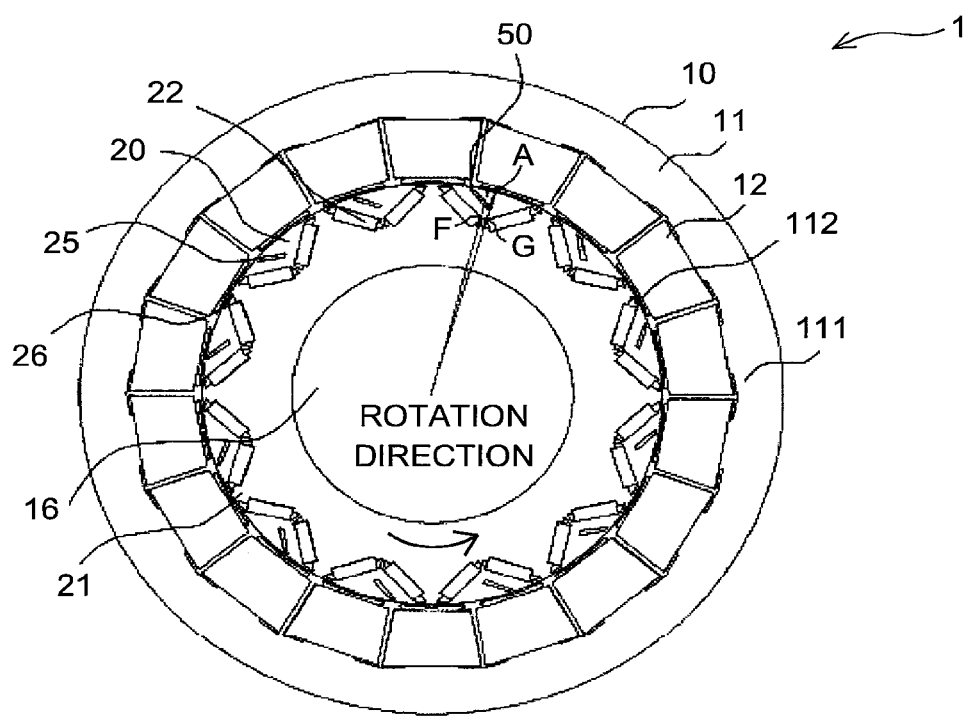
FIG. 31 is a sectional view of a permanent magnet rotating electric machine taken along the line A-A perpendicular to a rotation axis direction, which is an illustration of a basic structure according to a fourth embodiment of the present invention.

FIG. 31 is a sectional view taken along the line A-A perpendicular to a rotation axis direction, which is an illustration of a basic structure of a permanent magnet rotating electric machine according to a fourth embodiment of the present invention. In FIG. 31, configurations denoted by the same reference symbols as those in the drawings referred to for the description of the permanent magnet rotating electric machines 1 in the first embodiment and the third embodiment are the same or corresponding configurations, and description thereof is herein omitted. The fourth embodiment is different from the first embodiment and the third embodiment of the present invention in the configuration of each of the magnetic slits 25 and a configuration of a center bridge 43 described later.

Figure 32:
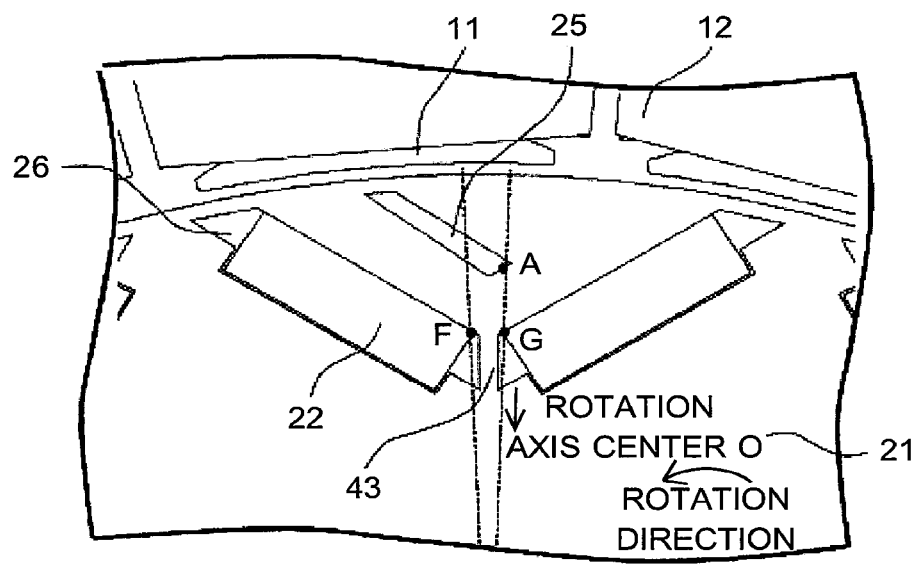
FIG. 32 is a view for illustrating a main part of the permanent magnet rotating electric machine, which is an illustration of the basic structure according to the fourth embodiment of the present invention.

A relationship between the magnetic slit 25 and the center bridge 43 is described with reference to FIG. 32. FIG. 32 is an enlarged view of FIG. 31 mainly for a part of the rotor 20, which forms one magnetic pole, in the permanent magnet rotating electric machine 1 according to this embodiment.

In many cases in which the V-shaped magnet structure including two permanent magnets 22 is adopted, the center bridge 43 is formed in the vicinity of a bottom of the V shape as illustrated in FIG. 32. In this embodiment, the center bridge 43 is formed in a vicinity of a position of the end point A of the magnetic slit on the rotation axis center side in the circumferential direction.

More specifically, an end of one of the two permanent magnets 22 for forming the V shape, which is located on the forward side in the rotating direction at the time of the power running operation, is represented as an end point F. The end point F is located on the most backward side of the one permanent magnet 22 in the rotating direction. An end of the permanent magnet 22 located on the backward side in the rotating direction at the time of the power running operation, which is located on the most forward side in the rotating direction, is represented as an end point G. A straight line for imaginarily connecting the rotation axis center O of the rotor 20 and the end point F is represented as a straight line OF. Further, a straight line for imaginarily connecting the rotation axis center O and the end point G is represented as a straight line OG. In this case, it is preferred that the end point A of the magnetic slit 25 on the rotation axis center side be positioned between the straight line OF and the straight line OG.

Figure 33:
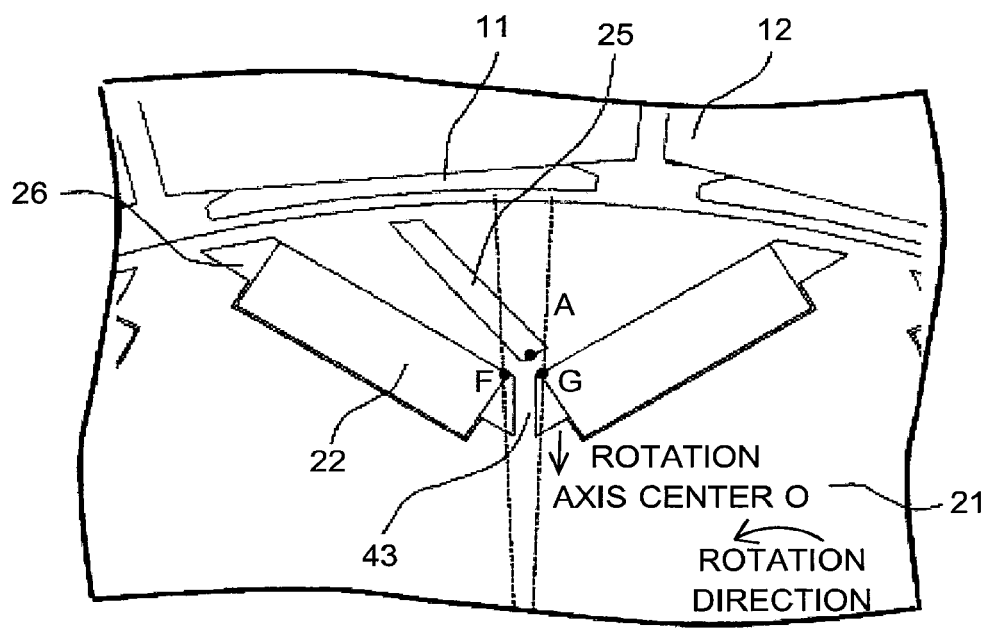
FIG. 33 is a view for illustrating a main part of a modification example of the permanent magnet rotating electric machine, which is an illustration of the basic structure according to the fourth embodiment of the present invention.

The endpoint A of the magnetic slit 25, which is close to the rotation axis center of the rotor 20, is positioned in a vicinity of a position of the center bridge 43 in the circumferential direction as described above. As a result, a stress of the rotor 20 which performs high-speed rotation is easily suppressed. Further, as illustrated in FIG. 33, it is more preferred that a distance between the end point A of the magnetic slit 25 on the rotation axis center side and each of the permanent magnets 22 or the flux barrier 26 formed on the rotation axis center side in the longitudinal direction of the permanent magnet 22 be set smaller than a width of the center bridge 43 in the circumferential direction. In this manner, leakage of the magnet magnetic flux 31 can be suppressed, and a high torque can be effectively exerted.

Thus, in addition to the effect of improving the torque as in the first embodiment and the third embodiment, the effect of exerting a higher torque is fulfilled.

Fifth Embodiment

Figure 34:
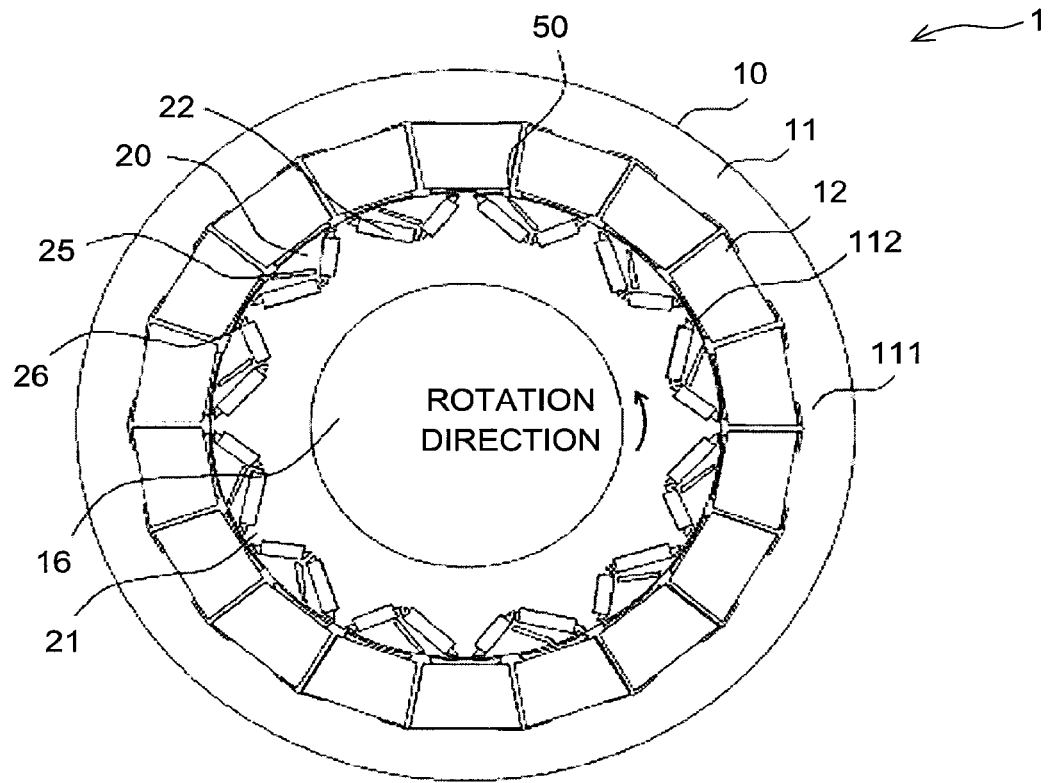
FIG. 34 is a sectional view of a permanent magnet rotating electric machine taken along the line A-A perpendicular to a rotation axis direction, which is an illustration of a basic structure according to a fifth embodiment of the present invention.

FIG. 34 is a sectional view taken along the line A-A perpendicular to a rotation axis direction, which is an illustration of a basic structure of a permanent magnet rotating electric machine according to a fifth embodiment of the present invention. In FIG. 34, configurations denoted by the same reference symbols as those in the drawings referred to for the description of the permanent magnet rotating electric machines 1 in the first embodiment, the third embodiment, and the fourth embodiment are the same or corresponding configurations, and description thereof is herein omitted. The fifth embodiment is different from the first embodiment, the third embodiment, and the fourth embodiment of the present invention in the configuration of each of the magnetic slits 25 and a configuration of the permanent magnets 22.

Figure 35:
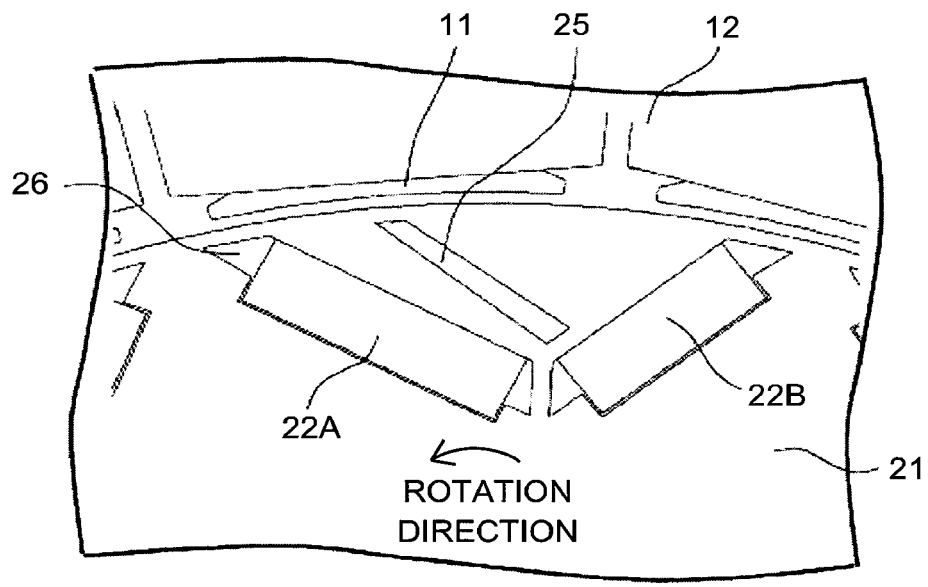
FIG. 35 is a view for illustrating a main part of the permanent magnet rotating electric machine, which is an illustration of the basic structure according to the fifth embodiment of the present invention.

The configuration of the magnets of this embodiment is described with reference to FIG. 35. FIG. 35 is an enlarged view of FIG. 34 mainly for a part of the rotor 20, which forms one magnetic pole, in the permanent magnet rotating electric machine 1 according to this embodiment.

The V-shaped magnet structure including two permanent magnets 22 is adopted as illustrated in FIG. 35, and the permanent magnets 22 are embedded in the rotor core 21. Each of the permanent magnets 22 having a rectangular shape is adopted as an example. In this case, the two permanent magnets 22 can be classified into a permanent magnet 22A and a permanent magnet 22B. The permanent magnet 22A is located on the forward side in the rotating direction at the time of the power running operation of the rotor 20, and the permanent magnet 22B is located on the backward side in the rotating direction at the time of the power running operation.

In this embodiment, the two magnets for forming the V shape have different lengths in the longitudinal direction.

Figure 36:
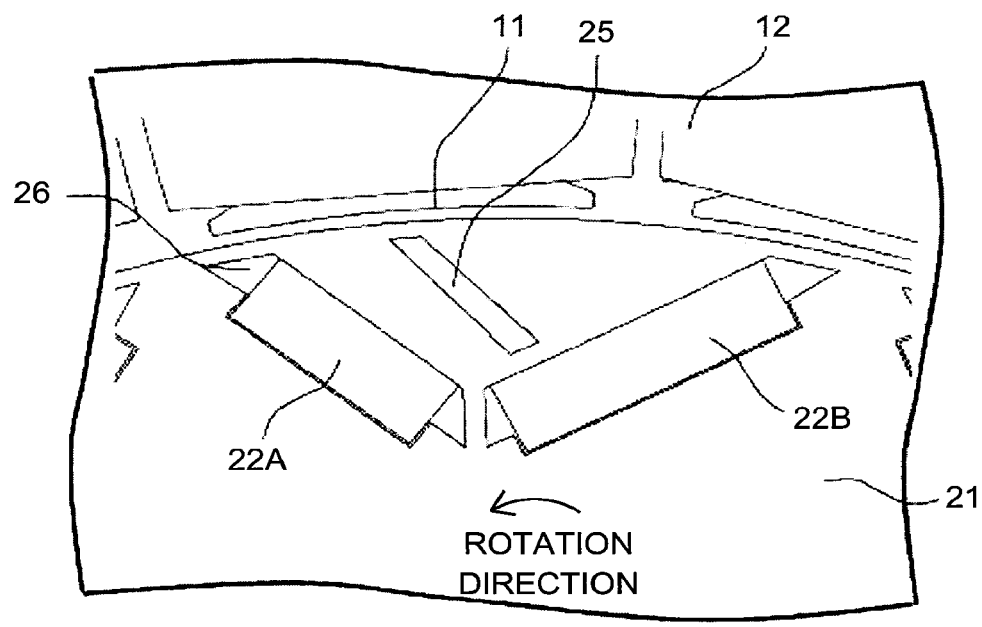
FIG. 36 is a view for illustrating a main part of a modification example of the permanent magnet rotating electric machine, which is an illustration of the basic structure according to the fifth embodiment of the present invention.

More specifically, a length of each long side of the forward-side magnet 22A is set larger than a length of each long side of the backward-side magnet 22B. With the configuration described above, magnetic saturation can be mitigated, and the effect of generating a higher torque is attained. Further, the lengths of the long sides of the two permanent magnets 22 for forming the V shape may be set so that the length of each long side of the backward-side magnet 22B is larger than the length of each long side of the forward-side magnet 22A, as illustrated in FIG. 36. Even in this case, the magnetic saturation can be mitigated, and the effect of generating a higher torque is attained.

Figure 37:
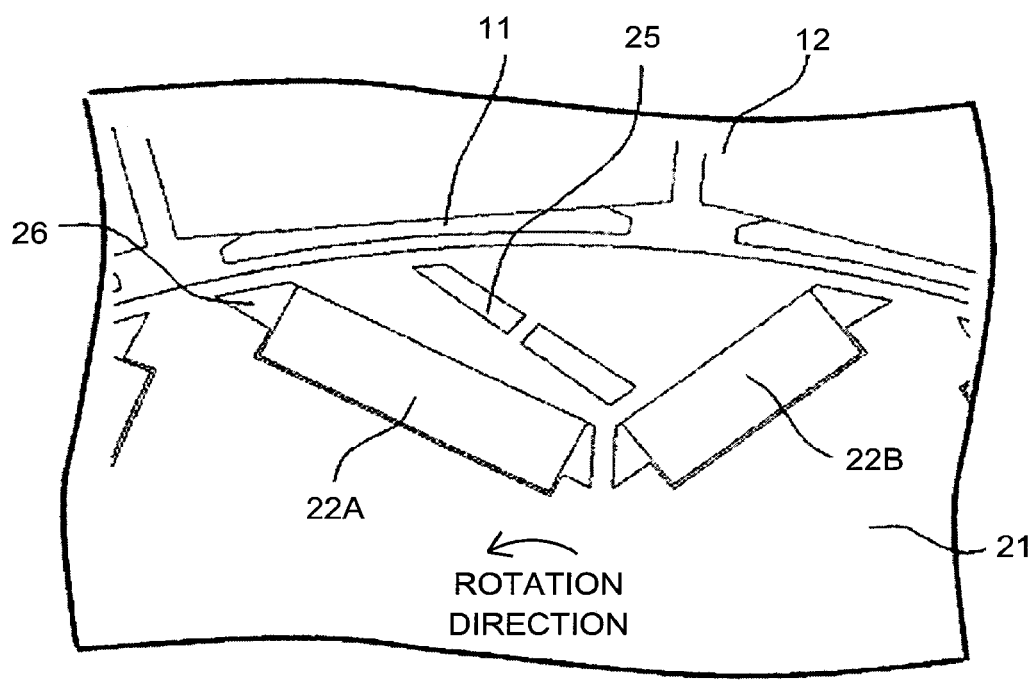
FIG. 37 is a view for illustrating a main part of a modification example of the permanent magnet rotating electric machine, which is an illustration of the basic structure according to the fifth embodiment of the present invention.

Further, as illustrated in FIG. 37, the magnetic slit 25 may be interrupted in the middle. The magnetic slit 25 has a slit traversing bridge at an intermediate position in a longitudinal direction of the magnetic slit 25. The slit traversing bridge is formed so as to divide the magnetic slit 25. The magnetic slit 25 is divided into two by the slit traversing bridge.

Thus, in addition to the effect of improving the torque as in the first embodiment, the third embodiment, and the fourth embodiment, the effect of exerting a higher torque is fulfilled.

As in the first embodiment, the third embodiment, and the fourth embodiment, the permanent magnet rotating electric machine 1 to be used for the power running operation has been described in this embodiment. However, when the permanent magnet rotating electric machine 1 is used for the regeneration operation, the permanent magnet rotating electric machine 1 can be used for the regeneration operation by using the same configuration as that of the second embodiment in this embodiment.

Sixth Embodiment

Figure 38:
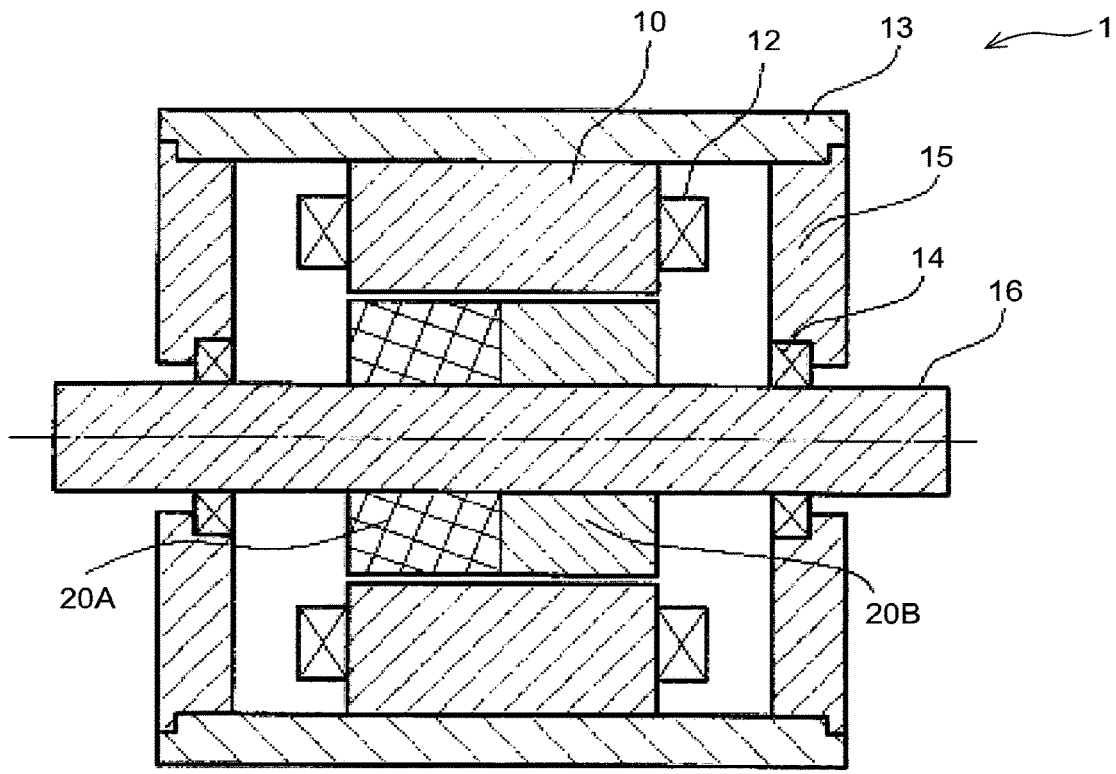
FIG. 38 is a longitudinal sectional view of a permanent magnet rotating electric machine according to a sixth embodiment of the present invention, which includes a rotation axis direction.
Figure 39:
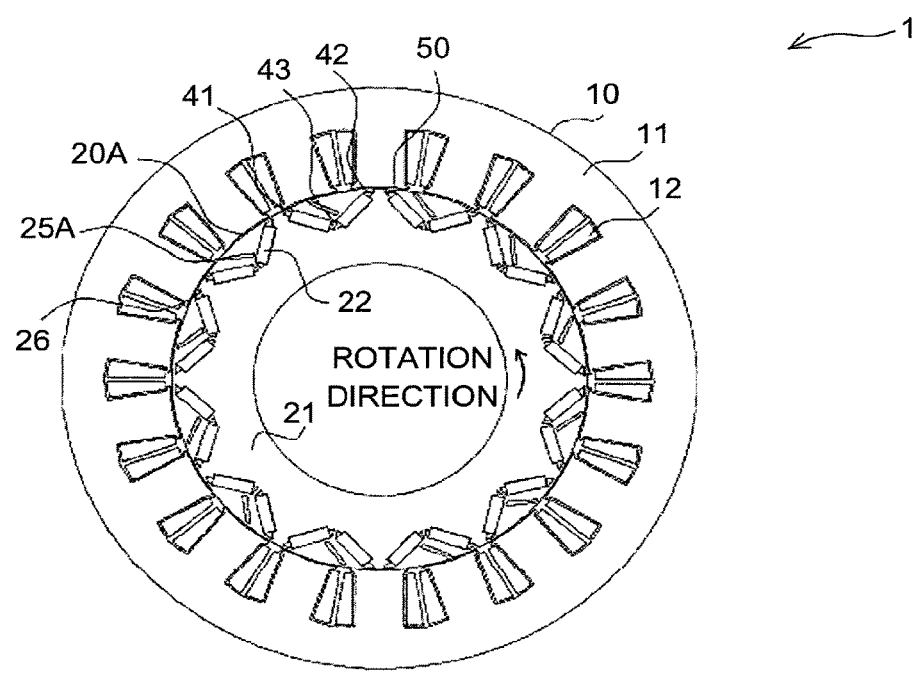
FIG. 39 is a sectional view of a rotor, which is perpendicular to the rotation axis direction and is an illustration of the basic structure of the permanent magnet rotating electric machine according to the sixth embodiment of the present invention.
Figure 40:
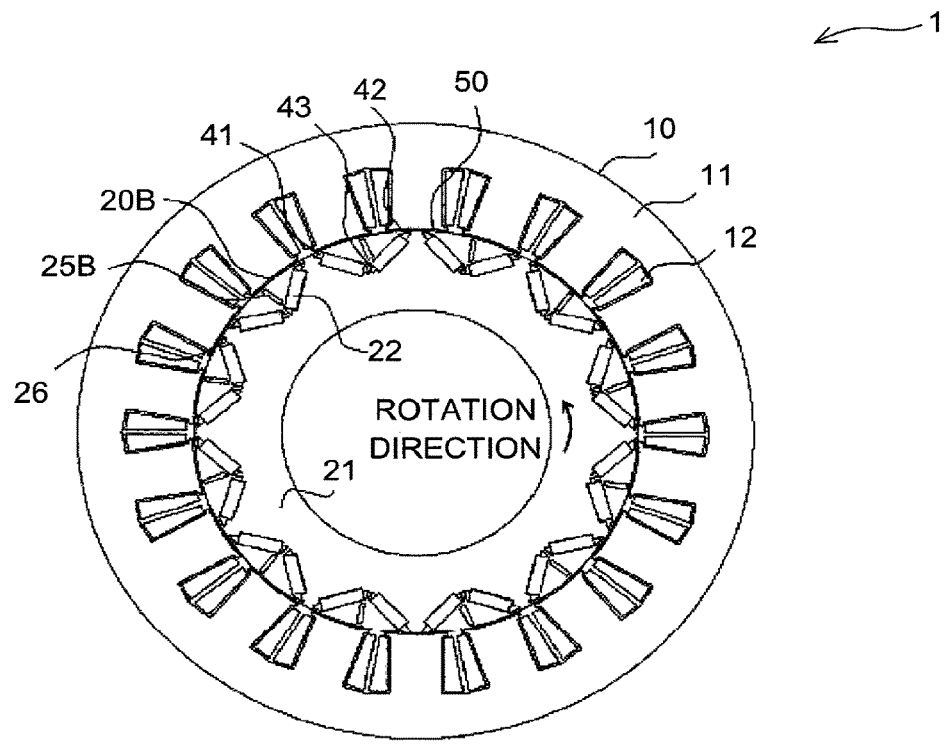
FIG. 40 is a sectional view of the rotor, which is perpendicular to the rotation axis direction and is an illustration of the basic structure of the permanent magnet rotating electric machine according to the sixth embodiment of the present invention.

FIG. 38 is a longitudinal sectional view of a permanent magnet rotating electric machine according to a sixth embodiment of the present invention, which includes a rotation axis direction. Further, FIG. 39 is a sectional view including a rotor 20A taken along a plane perpendicular to the rotation axis direction, which is an illustration of a basic structure of the permanent magnet rotating electric machine according to the sixth embodiment of the present invention. FIG. 40 is a sectional view including a rotor 20B taken along a plane perpendicular to the rotation axis direction, which is an illustration of the basic structure of the permanent magnet rotating electric machine according to the sixth embodiment of the present invention. In FIG. 38, FIG. 39, and FIG. 40, the configurations denoted by the same reference symbols as those in the drawings referred to for the description of the permanent magnet rotating electric machines according to the first and third to fifth embodiments are the same or corresponding configurations, and description thereof is herein omitted. The sixth embodiment is different from the first and third to fifth embodiments in configurations of the rotor 20A and the rotor 20B.

In the sixth embodiment, the rotor 20A and the rotor 20B are fixed as a plurality of rotors to a common rotary shaft. Specifically, the rotor is divided into two layers in an axial direction thereof. More specifically, as illustrated in FIG. 38, the plurality of rotors 20A and 20B are arranged so as to be held in contact with each other in the rotation axis direction while rotation axes thereof are matched with each other. Positions of the permanent magnets 22 in the rotor 20A are matched with positions of the permanent magnets 22 in the rotor 20B in the circumferential direction. Meanwhile, shapes and positions of magnetic slits 25A formed in the rotor 20A and those of magnetic slits 25B formed in the rotor 20B are different from each other when the magnetic slits 25A and the magnetic slits 25B are viewed along the rotation axis direction.

Each of the magnetic slits 25A formed in the rotor 20A and the magnetic slits 25B formed in the rotor 20B has an elongated shape extending from a vicinity of a corresponding one of the permanent magnets 22 to the vicinity of the gap 50. As in the first embodiment, each of the magnetic slits 25A and 25B is formed so that one of both ends of the magnetic slit 25 in the longitudinal direction, which is closer to an outer periphery of the rotor 20A than another end, is positioned in a region of the rotor core 21, which is located between the same side as the direction of the force in the circumferential direction and a magnetic pole center being a center of the magnetic pole for forming one pole, the force being applied to the rotor 20A by the torque. Further, the another one of the ends of the magnetic slit 25 in the longitudinal direction, which is closer to the rotation axis center side of the rotor 20A than the one end, is positioned on the magnetic pole center or in a region of the rotor core 21A, which is located between the side opposite to the direction of the force in the circumferential direction and the magnetic pole center, the force being applied to the rotor 20 by the energization of the coils 12. Each of the magnetic slits 25A formed in the rotor 20A and each of the magnetic slits 25B formed in the rotor 20B are different from each other in shape and position in the axial direction. Each of the magnetic slits 25A of the rotor 20A illustrated in FIG. 39 is formed so that a longitudinal direction of each of the magnetic slits 25A has an inclination with respect to a radial direction of the rotor 20A. Meanwhile, each of the magnetic slits 25B formed in the rotor 20B illustrated in FIG. 40 is formed so that a longitudinal direction of each of the magnetic slits 25B has little inclination with respect to a radial direction of the rotor 20B.

When the shape or the position of each of the magnetic slits 25 is changed, phases and amplitudes of a cogging torque, a torque ripple, and an electromagnetic excitation force change. Thus, with a combination of a plurality of kinds of rotors having magnetic slits 25A, 25B formed to have different shapes or positions, the cogging torque, the torque ripple, and the electromagnetic excitation force can be cancelled out. Further, a length of the rotor 20A and a length of the rotor 20B in the axial direction are only required to be determined so as to cancel out the cogging torque, the torque ripple, and the electromagnetic excitation force, and are not necessarily required to be set to the same length. Further, the permanent magnets 22 in the sixth embodiment are arranged at the same positions when viewed along the rotation axis direction. Thus, a common insertion work performed for the permanent magnets 22 can be achieved.

As in the first embodiment, and the third to fifth embodiments, the permanent magnet rotating electric machine to be used for the power running operation has been described in the sixth embodiment. However, when the permanent magnet rotating electric machine is used for the regeneration operation, the permanent magnet rotating electric machine can be used for the regeneration operation by using the same configuration as that of the second embodiment in the sixth embodiment. Further, two or more kinds of the rotors are combined. With increase in the number of kinds of rotors to be combined, the cogging torque, the torque ripple, and the electromagnetic excitation force can be further reduced. Further, there has been described the embodiment in which the magnetic slits 25A and the magnetic slits 25B are different from each other in shape and position in the axial direction. However, the magnetic slits 25A and the magnetic slits 25B may be different from each other only in shape in the axial direction. Further, the magnetic slits 25A and the magnetic slits 25B may be different from each other only in position in the axial direction.

Seventh Embodiment

Figure 41:
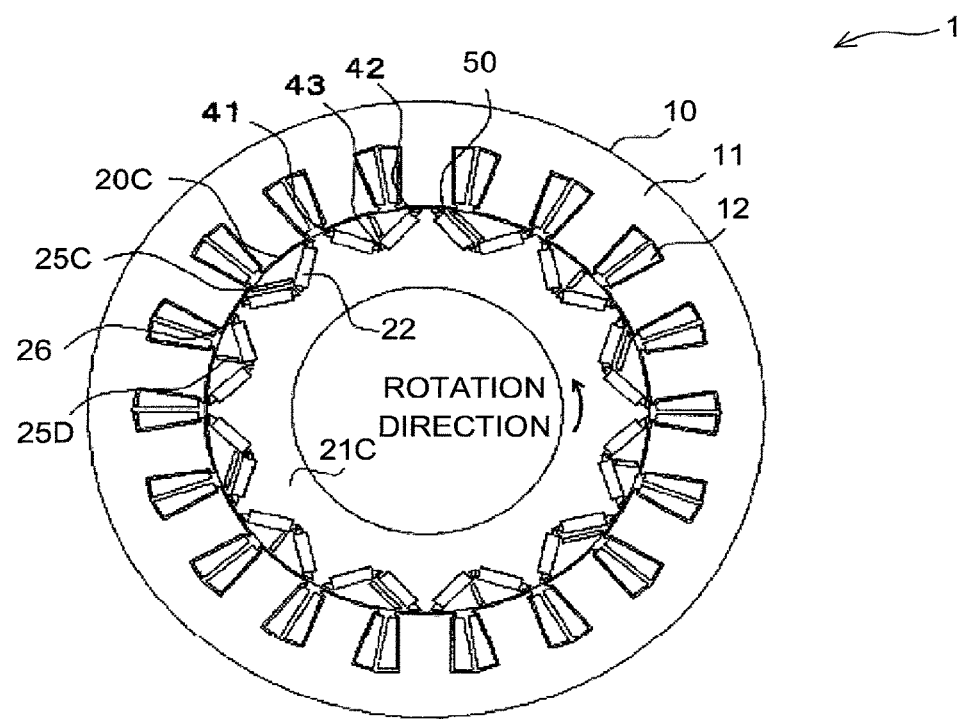
FIG. 41 is a sectional view of a rotor, which is perpendicular to a rotation axis direction and is an illustration of a basic structure of a permanent magnet rotating electric machine according to a seventh embodiment of the present invention.

FIG. 41 is a sectional view including a rotor 20C, which is taken along a plane perpendicular to a rotation axis direction and is an illustration of a basic structure of a permanent magnet rotating electric machine according to a seventh embodiment of the present invention. In FIG. 41, the configurations denoted by the same reference symbols as those in the drawings referred to for the description of the permanent magnet rotating electric machines according to the first and third to sixth embodiments are the same or corresponding configurations, and description thereof is herein omitted. The seventh embodiment is different from the first and third to sixth embodiments in magnetic slits 25C and 25D on the cross section of the rotor 20C.

In the seventh embodiment, a rotor core 21C of the rotor 20C has a plurality of kinds of magnetic slits 25C and 25D different from each other in shape and position. Each of the magnetic slits 25C and 25D is formed in a region of the rotor core 21C, which is located between the permanent magnets 22 for forming one magnetic pole and the gap 50. Two kinds of magnetic slits 25C and 25D are arranged alternately in a circumferential direction of the rotor 20C. Each of the magnetic slits 25C and 25D formed in the rotor 20C has an elongated shape extending from a vicinity of the permanent magnets 22 to a vicinity of the gap 50. As in the first embodiment, one of ends of each of the magnetic slits 25C and 25D in a longitudinal direction, which is closer to an outer periphery of the rotor 20C than another end, is positioned in a portion of the region of the rotor core 21C, which is located between the same direction side as the direction of the force in the circumferential direction and the magnetic pole center being the center of the magnetic pole for forming one magnetic pole, the force being applied to the rotor 20C by the torque. Further, the another one of the ends of each of the magnetic slits 25C and 25D in the longitudinal direction, which is closer to a rotation axis center of the rotor 20C than the one end, is positioned on the magnetic pole center or in a portion of the region of the rotor core 21C, which is located between the permanent magnets 22 and the gap 50, and between the side opposite to the direction of the force in the circumferential direction and the magnetic pole center, the force being applied to the rotor 20 by energization of the coils 12.

Each of the magnetic slits 25C is formed so that a longitudinal direction of each of the magnetic slits 25C has an inclination with respect to a radial direction of the rotor 20C. Meanwhile, each of the magnetic slits 25D is formed so that a longitudinal direction of each of the magnetic slits 25D has little inclination with respect to a radial direction of the rotor 20C. When the shape or the position of each of the magnetic slits is changed, phases and amplitudes of a cogging torque, a torque ripple, and an electromagnetic excitation force change. Thus, with the combination of the plurality of kinds of the magnetic slits 25C and 25D being different from each other in shape or position in one rotor, the cogging torque, the torque ripple, and the electromagnetic excitation force can be cancelled out.

With the combination of two kinds of the magnetic slits 25C and 25D being different from each other in shape or position in one rotor, the cogging torque, the torque ripple, and the electromagnetic excitation force can be reduced. Further, three or more kinds of magnetic slits can be combined. With increase in the number of kinds to be combined, the cogging torque, the torque ripple, and the electromagnetic excitation force can be further reduced.

Further, as in the sixth embodiment, a plurality of the rotors 20C may be arranged so as to be held in contact with each other in the axial direction. In this case, in contrast to the sixth embodiment in which the plurality of kinds of the rotors 20A and 20B are used, the same rotor core 21C can be used. Thus, cost can be reduced in comparison to that in the sixth embodiment.

Although the details of the present invention are specifically described above with reference to the preferred embodiments, it is apparent that persons skilled in the art may adopt various modifications based on the basic technical concepts and teachings of the present invention.

REFERENCE SIGNS LIST 1 permanent magnet rotating electric machine, 10 stator, 11 stator core, 12 coils, 13 frame, 14 bearing, 15 bracket, 16 rotary shaft, 20, 20A, 20B, 20C rotor, 21, 21C rotor core, 21A rotating-direction forward side core region, 21B rotating-direction backward side core region, 22 permanent magnet, 22A forward-side magnet, 22B backward-side magnet, 25, 25A, 25B, 25C, 25D magnetic slit, 26 flux barrier, 31 magnet magnetic flux, 32 reluctance magnetic flux, 41 backward-side outer bridge, 42 backward-side outer bridge, 43 center bridge, 50 gap, 111 core back, 112 tooth portion

The invention claimed is:

1. A permanent magnet rotating electric machine, comprising:
   a stator including a stator core and coils;
   a rotor, which is arranged so as to be opposed to the stator with a gap being a micro-gap, and is rotatable,
   wherein the rotor includes:
   a rotor core;
   a plurality of magnets embedded in the rotor core; and
   magnetic slits, each being formed in a core region of the rotor core, the core region being located between the magnets for forming one magnetic pole of the plurality of magnets and the gap, the magnetic slits being regions having a lower magnetic permeability than a magnetic permeability of the core region, within each core region is formed only one magnetic slit, a center line passing through a center of the only one magnetic slit along a longest dimension of the only one magnetic slit dividing the core region into a first portion of the core region and a second portion of the core region, the first portion of the core region being located on an upstream side of a rotation direction of the rotor with respect to the second portion of the core region,
   wherein a ratio of
   a length of an outer periphery of the rotor in the first portion of the core region to
   a first total length of all magnet magnetic flux generation sides of the magnets in the first portion of the core region
   is smaller than a ratio of
   a length of the outer periphery of the rotor in the second portion of the core region to
   a second total length of all magnet magnetic flux generation sides of the magnets in the second portion of the core region.

2. The permanent magnet rotating electric machine according to claim 1,
   wherein each of the magnetic slits has a first end closer to an outer periphery of the rotor and a second end closer to a rotation axis center of the rotor.

3. The permanent magnet rotating electric machine according to claim 1,
   wherein each of the magnetic slits has an outer periphery side end point being in contact with the gap and an end closer to a rotation axis center of the rotor.

4. The permanent magnet rotating electric machine according to claim 1, wherein the magnets for forming the one magnetic pole are arranged in a V-shape pattern.

5. The permanent magnet rotating electric machine according to claim 4, wherein a first thickness of an outer bride located between one end of one of the magnets for forming the one magnetic pole, which is located on the same direction side as the direction of the force in the first portion of the core region, and an outer periphery of the core region, is different from a second thickness of an outer bridge located between another end of the magnet, which is located on the side opposite to the direction of the force in the second portion of the core region, and the outer periphery of the core region.

6. The permanent magnet rotating electric machine according to claim 4, wherein a length of one of the magnets, which is located adjacent to the first portion of the core region, is the same as a length of another one of the magnets, which is located adjacent to the second portion of the core region.

7. The permanent magnet rotating electric machine according to claim 1, wherein a distance between an end of each of the magnetic slits, which is closest to a rotation axis center of the rotor, and each of the magnets forming the one magnetic pole, is shorter than a width of a center bridge located between the magnets for forming the one magnetic pole in the circumferential direction.

8. The permanent magnet rotating electric machine according to claim 1, comprising a structure in which a ratio of a number of the magnetic poles of the rotor and a number of slots of the stator is 2:3.

9. The permanent magnet rotating electric machine according to claim 1,
   wherein the rotor comprises a plurality of rotor segments,
   wherein the plurality of rotor segments are arranged in a rotation axis direction so that rotation axes of the plurality of segments are matched with each other, and
   wherein the rotor segments each include different magnetic slits that are different for each of the rotor segments in at least one of shape or position when viewed along the rotation axis direction.

10. The permanent magnet rotating electric machine according to claim 1, wherein at least any one of a shape or a position with respect to the at least two magnetic poles of each of the magnetic slits is different between at least two magnetic poles in the rotor.

11. The permanent magnet rotating electric machine according to claim 1, wherein a first area of the first portion of the core region is smaller than a second area of the second portion of the core region.

12. A permanent magnet rotating electric machine, comprising:
    a stator including a stator core and coils;
    a rotor, which is arranged so as to be opposed to the stator with a gap being a micro-gap, and is rotatable, wherein the rotor includes:

a rotor core;

a plurality of magnets embedded in the rotor core; and magnetic slits, each being formed in a core region of the rotor core, the core region being located between the magnets for forming one magnetic pole of the plurality of magnets and the gap, the magnetic slits being regions having a lower magnetic permeability than a magnetic permeability of the core region, within each core region is formed only more than one magnetic slits each being arranged along a same longest dimension of each of the more than one magnetic slits, a center line of each magnetic slit along the longest dimension of the each of the more than one magnetic slit dividing the core region into a first portion of the core region and a second portion of the core region, the first portion of the core region being located on an upstream side of a rotation direction of the rotor with respect to the second portion of the core region, wherein a ratio of a length of an outer periphery of the rotor in the first portion of the core region to a first total length of all magnet magnetic flux generation sides of the magnets in the first portion of the core region is smaller than a ratio of a length of the outer periphery of the rotor in the second portion of the core region to a second total length of all magnet magnetic flux generation sides of the magnets in the second portion of the core region.

13. A permanent magnet rotating electric machine, comprising:

a stator including a stator core and coils;

a rotor, which is arranged so as to be opposed to the stator with a gap being a micro-gap, and is rotatable, wherein the rotor includes:

a rotor core;

a plurality of magnets embedded in the rotor core; and magnetic slits, each being formed in a core region of the rotor core, the core region being located between the magnets for forming one magnetic pole of the plurality of magnets and the gap, the magnetic slits being regions having a lower magnetic permeability than a magnetic permeability of the core region, within each core region is formed only one magnetic slit, a center line passing through a center of the only one magnetic slit along a longest dimension of the only one magnetic slit dividing the core region into a first portion of the core region and a second portion of the core region, the first portion of the core region being located on an upstream side of a rotation direction of the rotor with respect to the second portion of the core region, wherein a ratio of a length of an outer periphery of the rotor in the first portion of the core region to a first total length of all magnet magnetic flux generation sides of the magnets in the first portion of the core region is larger than a ratio of a length of the outer periphery of the rotor in the second portion of the core region to a second total length of all magnet magnetic flux generation sides of the magnets in the second portion of the core region.

* * * * *